US012663923B2

(12) United States Patent
Vasilakis et al.

(10) Patent No.: US 12,663,923 B2
(45) Date of Patent: Jun. 23, 2026

(54) IDENTIFICATION OF RANDOM-ACCESS PAGES AND MITIGATION OF THEIR IMPACT ON COMPRESSIBLE COMPUTER MEMORIES

(71) Applicant: Zeropoint Technologies AB, Gothenburg (SE)

(72) Inventors: Evangelos Vasilakis, Västra Frölunda (SE); Angelos Arelakis, Hovås (SE); Vasileios Spiliopoulos, Mölndal (SE); Per Stenström, Torslanda (SE)

(73) Assignee: Zeropoint Technologies AB, Gothenburg (SE)

( * ) Notice: Subject to any disclaimer, the term of this patent is extended or adjusted under 35 U.S.C. 154(b) by 0 days.

(21) Appl. No.: 18/836,561

(22) PCT Filed: Feb. 15, 2023

(86) PCT No.: PCT/SE2023/050130
§ 371 (c)(1),
(2) Date: Aug. 7, 2024

(87) PCT Pub. No.: WO2023/158357
PCT Pub. Date: Aug. 24, 2023

(65) Prior Publication Data
US 2025/0147662 A1 May 8, 2025

(30) Foreign Application Priority Data
Feb. 15, 2022 (SE) .................................. 2250153-0

(51) Int. Cl.
*G06F 3/06* (2006.01)
(52) U.S. Cl.
CPC ............ *G06F 3/0608* (2013.01); *G06F 3/064* (2013.01); *G06F 3/0673* (2013.01)

(58) Field of Classification Search
CPC .............................. G06F 3/0608; G06F 3/064
See application file for complete search history.

(56) References Cited

U.S. PATENT DOCUMENTS

| | | | |
|---|---|---|---|
| 5,812,817 | A | 9/1998 | Hovis et al. |
| 2006/0101206 | A1 | 5/2006 | Wood et al. |

(Continued)

FOREIGN PATENT DOCUMENTS

WO    WO-2020101562 A1 *  5/2020  ............. G06F 12/08

OTHER PUBLICATIONS

Nakar, D., & Weiss, S. (2004). Selective main memory compression by identifying program phase changes. 137-140. Paper presented at 2004 23rd IEEE Convention of Electrical and Electronics Engineers in Israel, Proceedings, Tel-Aviv, Israel.

(Continued)

*Primary Examiner* — Jared I Rutz
(74) *Attorney, Agent, or Firm* — Ballard Spahr LLP

(57) ABSTRACT

A device for managing compressible computer memory is described. The device has a memory region categorization arrangement configured to monitor memory requests to the computer memory and categorize memory regions based on spatio-temporal locality of the memory requests made to the memory regions. A memory region is categorized to exhibit low spatio-temporal locality when memory requests to said memory region are less frequent than a threshold. The device further has a selective computer memory management arrangement operatively connected with the memory region categorization arrangement and comprising a bypassed memory access mechanism and a compressed memory access mechanism. The bypassed memory access mechanism is configured to handle memory contents of memory regions categorized to exhibit low spatio-temporal locality in uncompressed form in the computer memory. The (Continued)

1800
Managing compressible computer memory

1810
Monitoring memory requests to the computer memory to categorize memory regions based on spatio-temporal locality of the memory requests made to the memory regions 1820
Selectively managing the compressible computer memory depending on categorization:

1830
For memory contents of memory regions categorized to exhibit low spatio-temporal locality ("random-access pages"), store in uncompressed form in the computer memory 1840
For memory contents of memory regions not categorized to exhibit low spatio-temporal locality, store in compressed form in the computer memory.

compressed memory access mechanism is configured to handle memory contents of memory regions not categorized to exhibit low spatio-temporal locality in compressed form in the computer memory.

28 Claims, 19 Drawing Sheets

(56)                    References Cited

U.S. PATENT DOCUMENTS

| | | |
|---|---|---|
| 2014/0006745 A1 | 1/2014 | Fontenot et al. |
| 2016/0253105 A1* | 9/2016 | Chang ................... G06F 3/0608 |
| | | 711/154 |
| 2017/0153814 A1* | 6/2017 | Ryu ........................ G06F 3/064 |
| 2018/0046381 A1* | 2/2018 | Fagiano ................ G06F 3/0685 |
| 2018/0143770 A1* | 5/2018 | Arelakis ................. H03M 7/30 |
| 2022/0091753 A1* | 3/2022 | Zentz .................... G06F 3/0688 |

OTHER PUBLICATIONS

Choukse, E., Erez, M., & Alameldeen, A. R. (2018). Compresso: pragmatic main memory compression. 2018 51st Annual IEEE/ACM International Symposium on Microarchitecture (MICRO). https://doi.org/10.1109/micro.2018.00051.
International Search Report was mailed on Mar. 13, 2023 by the International Searching Authority for International Application No. PCT/SE2023/050130 filed on Feb. 15, 2022 and published as WO2023158357 (Applicant—ZeroPoint Technologies AB) (5 pages).
Written Opinion was mailed on Mar. 13, 2023 by the International Searching Authority for International Application No. PCT/SE2023/050130 filed on Feb. 15, 2022 and published as WO2023158357 (Applicant—ZeroPoint Technologies AB) (5 pages).

\* cited by examiner

1100

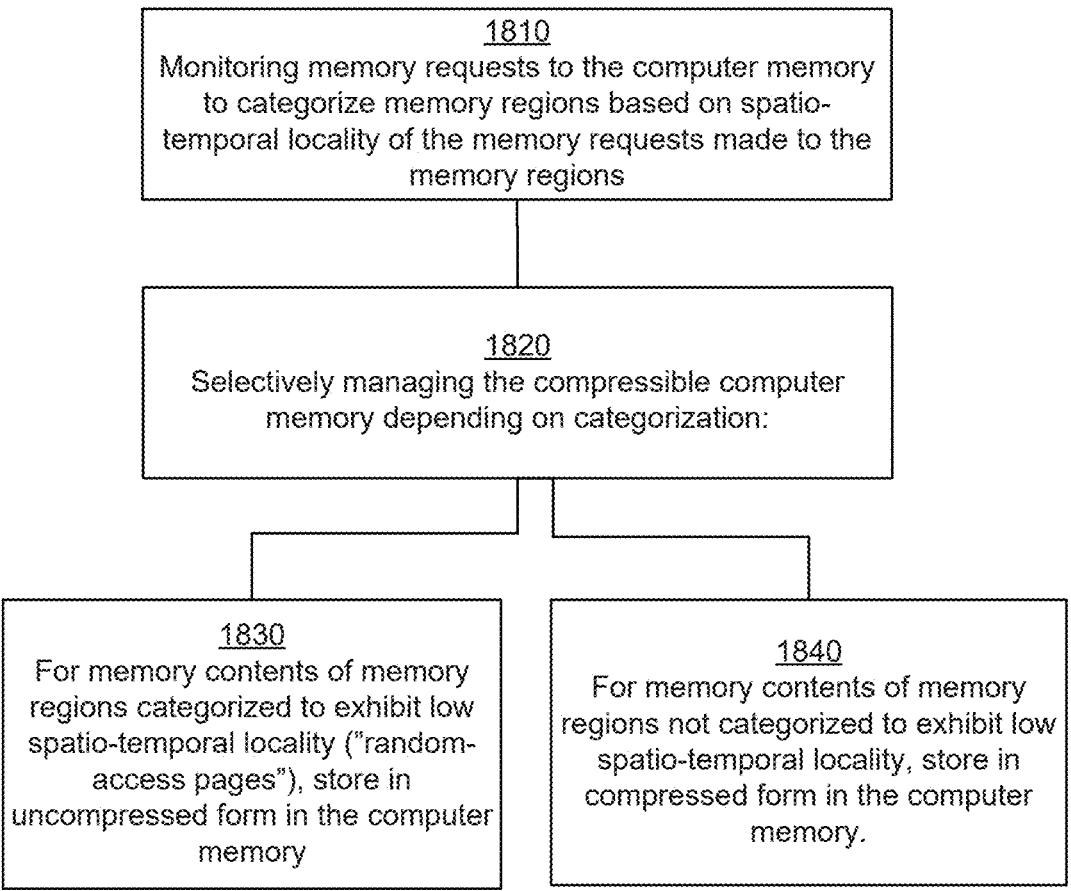

<u>1800</u>

Managing compressible computer memory

<u>1810</u>
Monitoring memory requests to the computer memory to categorize memory regions based on spatio-temporal locality of the memory requests made to the memory regions <u>1820</u>
Selectively managing the compressible computer memory depending on categorization:

<u>1830</u>
For memory contents of memory regions categorized to exhibit low spatio-temporal locality ("random-access pages"), store in uncompressed form in the computer memory <u>1840</u>
For memory contents of memory regions not categorized to exhibit low spatio-temporal locality, store in compressed form in the computer memory.

*Fig 18*

IDENTIFICATION OF RANDOM-ACCESS PAGES AND MITIGATION OF THEIR IMPACT ON COMPRESSIBLE COMPUTER MEMORIES

CROSS-REFERENCE TO RELATED APPLICATIONS

This application is a U.S. National Phase Application of International Application No. PCT/SE2023/050130, filed Feb. 15, 2023, which claims priority to Swedish Application No. 2250153-0, filed Feb. 15, 2022, each of which are hereby incorporated by reference in their entirety.

TECHNICAL FIELD

This subject matter generally relates to the field of data compression in memories in electronic computers. More specifically, the present invention relates to a method of managing compressible computer memory, a device comprising logic circuitry configured to perform this method, a device for managing compressible computer memory, and a computer system comprising such a device.

BACKGROUND

Data compression is a general technique to store and transfer data more efficiently by coding frequent collections of data more efficiently than less frequent collections of data. It is of interest to generally store and transfer data more efficiently for a number of reasons. In computer memories, for example memories that keep data and computer instructions that processing devices operate on, for example in main or cache memories, it is of interest to store said data more efficiently, say K times, as it then can reduce the size of said memories potentially by K times, using potentially K times less communication capacity to transfer data between one memory to another memory and with potentially K times less energy expenditure to store and transfer said data inside or between computer systems and/or between memories. Alternatively, one can potentially store K times more data in available computer memory than without data compression. This can be of interest to achieve potentially K times higher performance of a computer without having to add more memory, which can be costly or can simply be less desirable due to resource constraints. As another example, the size and weight of a smartphone, a tablet, a lap/desktop or a set-top box can be limited as a larger or heavier smartphone, tablet, a lap/desktop or a set-top box could be of less value for an end user; hence potentially lowering the market value of such products. Yet, making more memory capacity or higher memory communication bandwidth available can potentially increase the market value of the product as more memory capacity or memory communication bandwidth can result in higher performance and hence better utility of the product.

To summarize, in the general landscape of computerized products, including isolated devices or interconnected ones, data compression can potentially increase the performance, lower the energy expenditure, increase the available memory communication bandwidth or lower the cost and area consumed by memory. Therefore, data compression has a broad utility in a wide range of computerized products beyond those mentioned here.

To take advantage of data compression to increase the capacity concerning either the size or the transfer capability of computer memory, there is a need for an address-mapping mechanism that maps fixed-size pages in a conventional non-compressed memory system to variable-sized pages in a compressed memory. Such an address-mapping mechanism typically comprises a plurality of entries, where each entry can map an arbitrary fixed-sized page to an arbitrary location in the compressed memory. On a first access to a compressed page, there will be a miss, referred to as an address-mapping miss, in the address-mapping mechanism. Said miss will trigger the fetching of metadata in computer memory to establish the mapping between said fixed-size and compressed pages. As this causes an additional memory access, which is performance costly, it is desirable to keep the number of address-mapping misses at a minimum.

The data contained in a non-compressed, fixed-sized memory page is logically divided into a fixed number of fixed-sized memory blocks. For example, if a fixed-sized memory page is 4096 bytes and the fixed-sized memory block is 64 bytes, said page will contain 4096/64=64 memory blocks. In a conventional, non-compressed computer memory, every memory request will typically return a fixed-sized memory block. In contrast, in a compressed computer memory, memory blocks will be variable-sized, and a memory request may return a plurality of compressed memory blocks. As an example, if all memory blocks are compressed by a factor of two, two compressed memory blocks will be returned on each memory request. As another example, if all memory blocks are compressed by a factor of four, four compressed memory blocks will be returned on each memory request.

Going back to the address-mapping mechanism needed to locate a compressed page, the memory traffic caused by the extra memory request resulting from an address-mapping miss can be compensated for if at least one memory request to said page will bring at least one additional compressed block that will be later accessed. On the other hand, if no memory request to a page brings additional compressed blocks that are later accessed, the address-mapping miss to said page will create extra memory traffic, in comparison with a conventional system with no compression, which results in performance loss. We refer to such pages as random-access pages (a synonym term would be infrequent-access pages).

Identifying random-access pages and remedying the negative impact of them is desirable. If random-access pages can be identified, one can avoid the extra traffic they cause through a mitigation strategy. The present invention presents systems, methods, and devices for identifying random-access pages and mitigating the negative impact they have on the performance of compressed memories.

SUMMARY

Generally, the present invention presents methods devices and systems for identifying random-access pages and mitigating the negative impact they have on performance.

A first aspect of the present invention is a method of managing compressible computer memory. The method comprises monitoring memory requests to the computer memory to categorize memory regions based on spatio-temporal locality of the memory requests made to the memory regions, wherein a memory region is categorized to exhibit low spatio-temporal locality when memory requests to said memory region are less frequent than a threshold. The method further comprises selectively managing the compressible computer memory depending on categorization, such that memory contents of memory regions categorized to exhibit low spatio-temporal locality are stored in uncompressed form in the computer memory, whereas memory contents of memory regions not categorized to exhibit low spatio-temporal locality are stored in compressed form in the computer memory.

A second aspect of the present invention is a device comprising logic circuitry configured to perform the method according to the first aspect. The device is typically a semiconductor device (electronic device). In advantageous embodiments, it may be configured to be connected between a memory controller and a cache memory of a computer system. In alternative embodiments, without limitation, the device may be included in or implemented by a memory controller of a computer system.

A third aspect of the present invention is a device for managing compressible computer memory. The device has a memory region categorization arrangement configured to monitor memory requests to the computer memory, and to categorize memory regions based on spatio-temporal locality of the memory requests made to the memory regions. A memory region is categorized to exhibit low spatio-temporal locality when memory requests to said memory region are less frequent than a threshold. The device further has a selective computer memory management arrangement operatively connected with the memory region categorization arrangement. The selective computer memory management arrangement comprises a bypassed memory access mechanism and a compressed memory access mechanism. The bypassed memory access mechanism is configured to handle memory contents of memory regions categorized to exhibit low spatio-temporal locality in uncompressed form in the computer memory. The compressed memory access mechanism is configured to handle memory contents of memory regions not categorized to exhibit low spatio-temporal locality in compressed form in the computer memory.

A fourth aspect of the present invention is a computer system that comprises one or more processors, compressible main memory, and a device according to the second or third aspects of the present invention.

In typical embodiments, each memory region will constitute a memory page in the computer memory, or a sequence of contiguous memory pages in the computer memory, each memory page comprising a number of memory blocks, compressed memory contents being retrievable from the computer memory as a compressed package consisting of a number of compressed consecutive memory blocks compacted into one physical memory block. In typical embodiments, a memory region will be considered to exhibit low spatio-temporal locality when the number of memory requests to memory blocks that belong or would belong to the same compressed package is below a threshold. Alternatively, a memory region may be considered to exhibit low spatio-temporal locality when a first memory request to a memory block in the memory region is not followed, within a monitored time period, by a second memory request to a second memory block that belongs or would belong to the same compressed package.

Generally, whenever reference is made to compression of computer memory in this document, the skilled person will understand that any known compression principle can be employed, such as entropy-based encoding, statistical encoding, dictionary-based encoding, delta-based encoding, without limitation.

Other aspects, as well as objectives, features and advantages of the disclosed embodiments will appear from the following detailed patent disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

DESCRIPTION OF DRAWINGS

FIG. 18 depicts a method of managing compressible computer memory generally according to an aspect of the present invention.

DETAILED TECHNICAL DESCRIPTION

This document discloses systems, methods and devices to identify random-access pages and mitigate the negative impact they have on performance in compressed memories. Aspects of the present invention in a more generalized form will be presented towards the end of this detailed disclosure with particular reference to FIG. 18 which depicts a method of managing compressible computer memory, and FIG. 19 which depicts a device for managing compressible computer memory. To enable a full understanding and appreciation of these broad aspects of the present invention, the description will however start with FIG. 1 through FIG. 17, and then conclude by reverting to FIG. 18 and FIG. 19.

Figure 1:
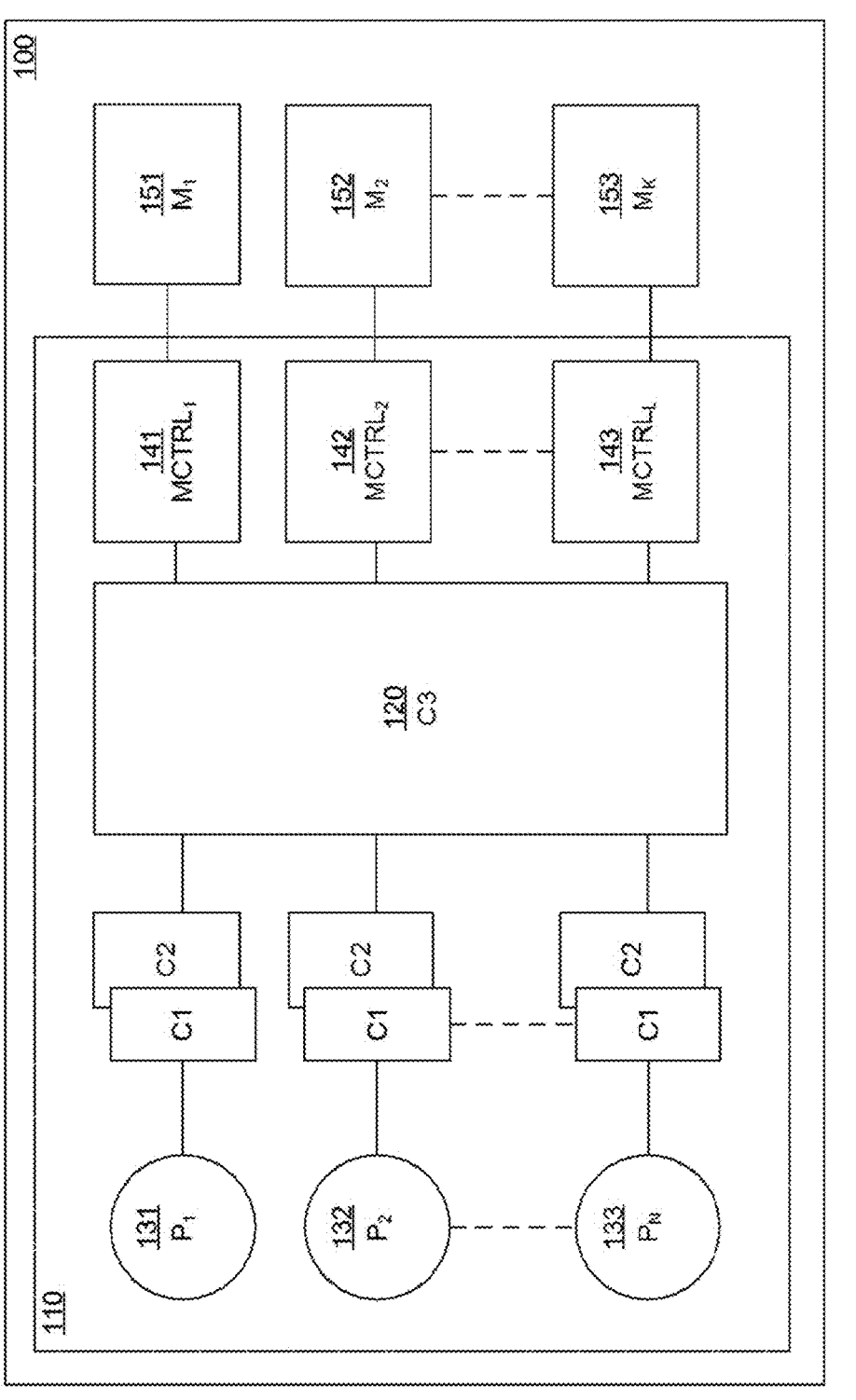
FIG. 1 depicts an exemplary computer system comprising a microprocessor chip with one or a plurality of processing units, an exemplary cache hierarchy of three levels, and one or a plurality of memory controllers connected to one or a plurality of off-chip memories.

An exemplary embodiment of a computer system 100 is depicted in FIG. 1. This system comprises a microprocessor chip 110 and one or a plurality of memory modules denoted M₁ 151, M₂ 152 through M_K 153. The microprocessor chip could be a discrete system or integrated on a system-on-a-chip (SoC) in any available technology. The microprocessor 110 comprises one or several processing units, denoted P₁ 131, P₂ 132 through P_N 133 sometimes called CPU or core and a memory hierarchy. The memory hierarchy, on the other hand, comprises several cache levels, e.g., three levels as is shown exemplary in FIG. 1 and denoted C1, C2, C3, as well as main memory in the form of the memory modules M₁-M_K. These levels can be implemented in the same or different memory technologies, e.g., SRAM, DRAM, or any type of non-volatile technology including, for example, Phase-Change Memory (PCM), STT-RAM or High-Bandwidth Memory (HBM).

The number of cache levels may vary in different embodiments and the exemplary embodiment 100 depicts three levels where the last cache level is C3 120. These levels are connected using some kind of interconnection means, e.g., a bus or any other interconnection network such as meshes, hypercubes etc. In the exemplary embodiment, levels C1 and C2 are private to, and only accessible by, a respective processing unit i denoted P_i (e.g. P₁ in FIG. 1). It is well known to someone skilled in the art that alternative embodiments can have any number of private cache levels or, as an alternative, all cache levels are shared as illustrated by the third level C3 120 in FIG. 1. Regarding the inclusion of the data in the cache hierarchy, any embodiment is possible and can be appreciated by someone skilled in the art. For example, C1 can be included in C2 whereas C2 can be non-inclusive with respect to level C3. Someone skilled in the art can appreciate alternative embodiments.

The computer system 100 of FIG. 1 comprises one or a plurality of memory controllers, denoted MCTRL₁ 141, MCTRL₂ 142, through MCTRL_L 143. The last cache level (exemplary denoted C3 in FIG. 1) is connected to the memory controllers, which in turn are connected to one or a plurality of the memory modules M₁-M_K. The memory controllers can be integrated on the microprocessor chip 110 or can be implemented outside the microprocessor chip. Finally, a computer system runs one or more tasks. A task can be any software application or part of it, e.g., as in a multithreaded application.

Identification and Mitigation of the Impact of Random-Access Pages in Compressed Memory Systems Computer systems, as exemplified by the embodiment in FIG. 1, can suffer from a limited capacity of the main memory (e.g. the memory modules M₁ 151 through M_K 153) and of the cache memories, regardless of level (e.g. C1, C2 and C3 in FIG. 1). A limited cache capacity can manifest itself as a higher fraction of memory requests having to be serviced at the next level in the memory hierarchy leading to losses in performance or higher energy consumption. To mitigate this problem, one can consider increasing cache capacity, thereby reducing the number of requests that need to be serviced by the next level of the memory hierarchy.

In another scenario, the bandwidth of the link between memory controller and memory, for example between MCTRL₁ 141 and M₁ 151 in FIG. 1, can be limited. Compressing data in memory and/or in caches can mitigate the aforementioned capacity and/or bandwidth limitations by allowing more data to be stored in memory and/or caches and by transferring more data between a memory controller and a memory device.

Figure 2:
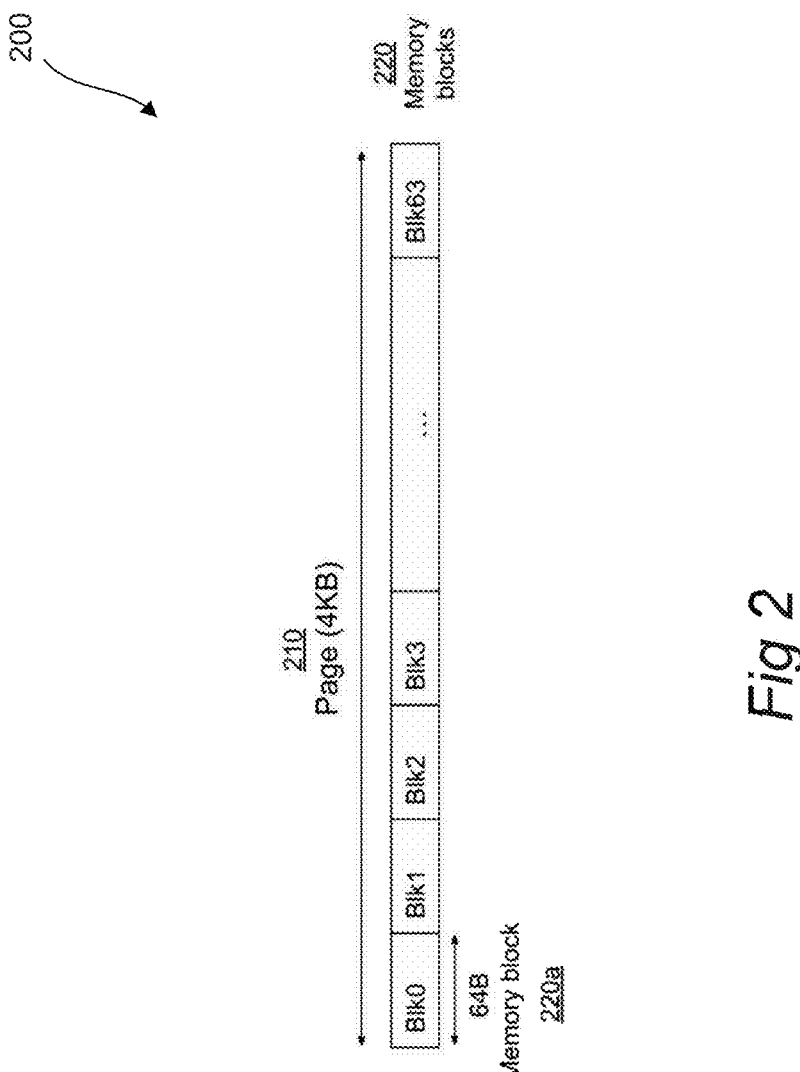
FIG. 2 depicts the layout of an uncompressed memory page.
Figure 3:
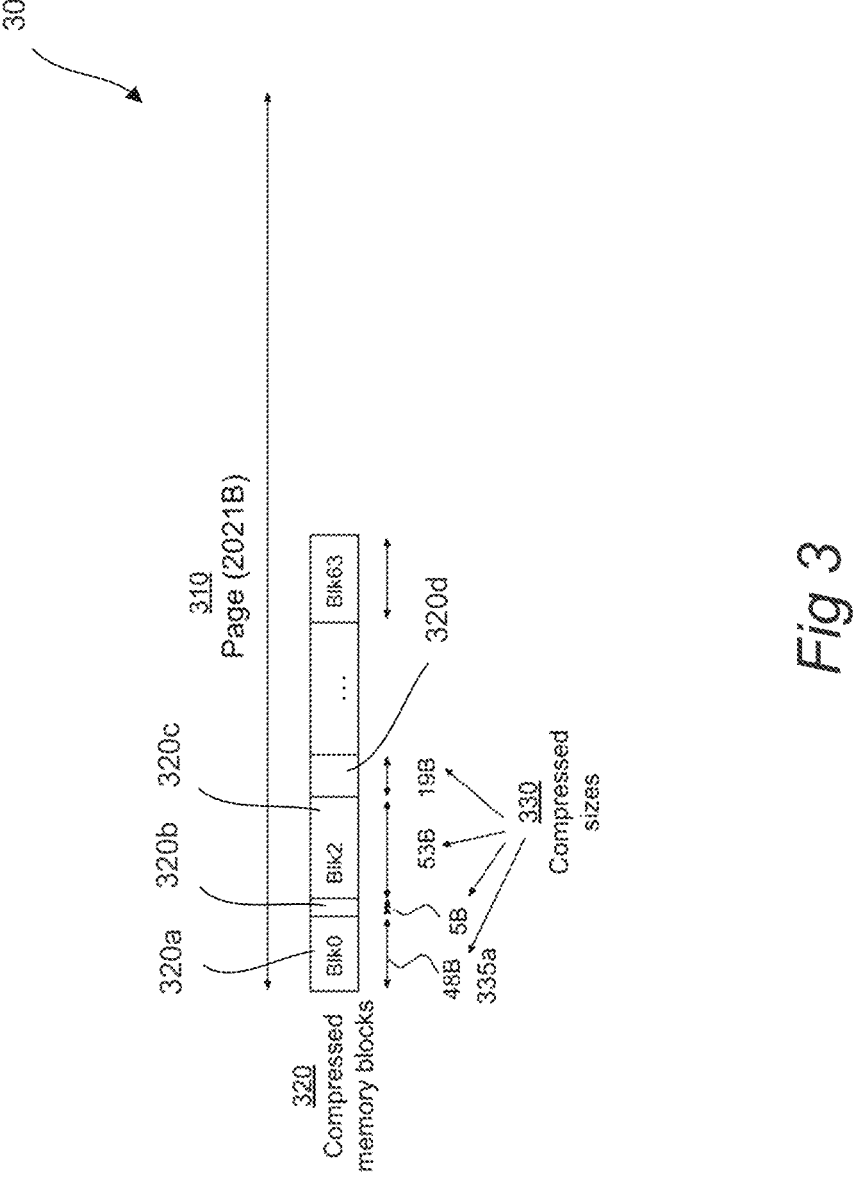
FIG. 3 depicts the layout of a compressed memory page.

In a compressed memory system, compressed data is smaller in size. Let us first look at the uncompressed page layout 200 of FIG. 2. As can be seen in FIG. 2, an uncompressed page 210 may have a size of 4 KB (kilo bytes). Each memory block 220a will then have a size of 64 B (bytes) in a system without compression. There are hence 64 memory blocks 220 denoted Blk0, Blk 1, . . . , Blk63 in FIG. 2. Now consider the compressed page layout 300 of FIG. 3. In a system applying compression, the memory block size will be typically less than 64 B. For example, while the memory blocks 220 (Blk0, Blk1. . . . Blk63) were 64 B each in FIG. 2, the memory blocks 330 are of variable size in a compressed memory system, as depicted in FIG. 3. Here, the compressed sizes 330 of memory blocks 320a (Blk0), 320b, 320c (Blk2) and 320d are 48, 5, 53 and 19 B, respectively. Compressed data makes a more efficient utilization of the space it is stored in as opposed to uncompressed data. However, its location is unknown due to its variable size. For this reason, compressed memory-systems need metadata to locate compressed data.

Figure 4:
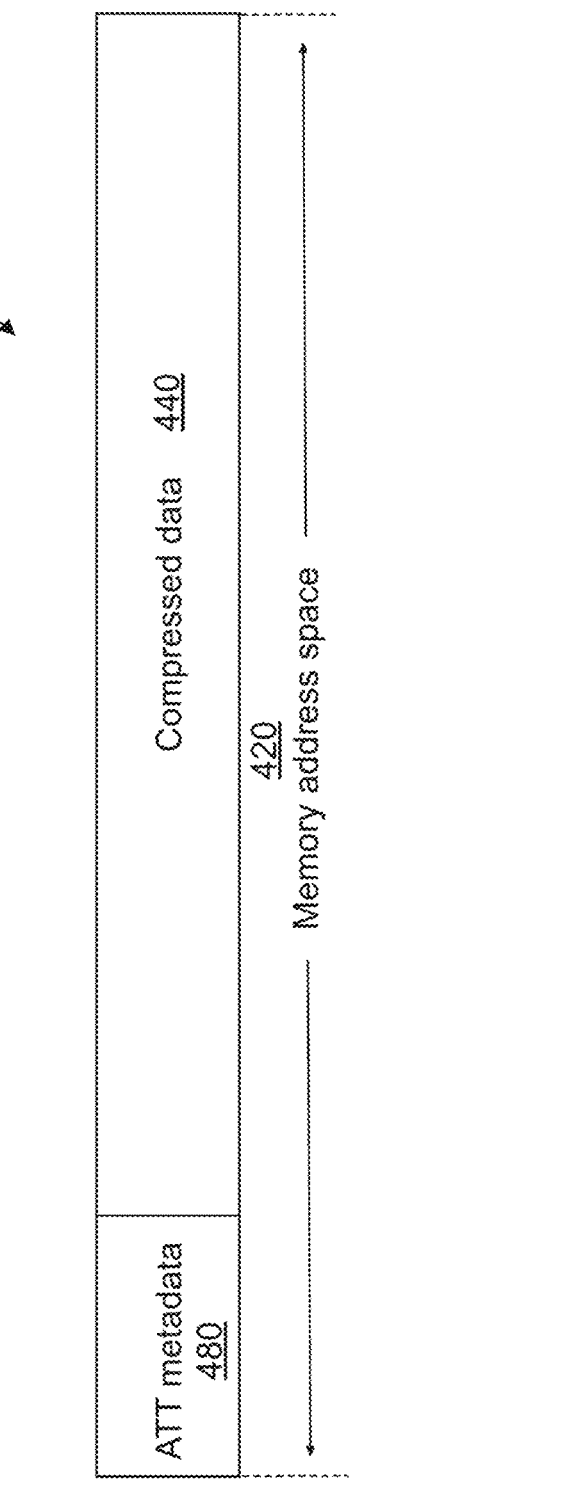
FIG. 4 depicts how compression metadata is reserved in the memory address space along with compressed data.

In an exemplary compressed memory system, a memory layout 400 depicted in FIG. 4 contains compressed data 440 as well as address translation table (ATT) metadata 480 allocated in the memory. The ATT metadata 480 keeps information of where every single memory block is contained in a compressed memory address space 420.

Prior art covers many embodiments of metadata layouts to locate compressed memory blocks. In one embodiment, metadata stores the location of the compressed memory blocks. In a second embodiment, metadata stores the size of the compressed memory blocks. In yet another embodiment, metadata can store both the location and the size of the compressed memory blocks. In alternative embodiments, metadata can in addition or instead of record the state of whether a memory block is compressed, or the compression algorithm used if more than one algorithms are used.

Computer systems organize several memory blocks together forming memory pages (210 in FIGS. 2 and 310 in FIG. 3). Because of this data organization, it is natural to combine the compression metadata of memory blocks belonging to the same memory page. In one embodiment a memory page may refer to the entity managed by the operating system (OS), called an OS memory page. In another embodiment, a memory page may refer to a sequence of memory blocks all mapped to a set of memory devices, for example M₁ 151 in FIG. 1 controlled by a specific memory controller for example MCTRL₁ 141 in FIG. 1. In this embodiment, the memory-page organization might not be equivalent to the OS memory page. This is in particular beneficial for computer systems with memory interleaving where the OS memory page is interleaved across a plurality of memory controllers. If the metadata is organized based on the OS data, the metadata for a specific page would be spread across a plurality of memory controllers and their associated memory devices. On the other hand, if the metadata is organized to reflect how data is mapped to one memory controller, this will make the metadata handling more efficient.

Figure 5:
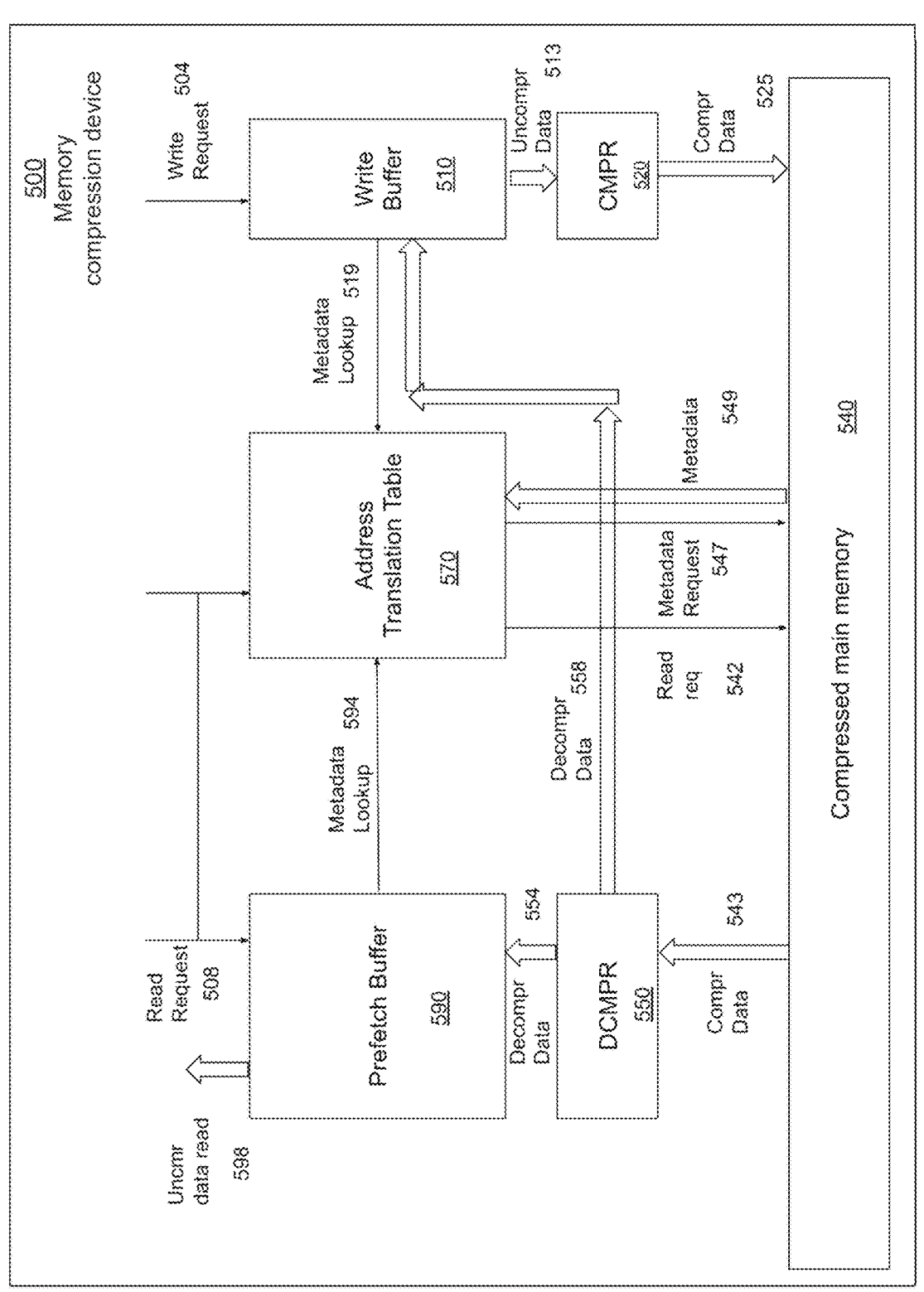
FIG. 5 is a general illustration of a memory compression device (i.e., a device for accessing compressed computer memory).

FIG. 5 shows an exemplary device 500 for accessing compressed computer memory, which in a shortened notation will be referred to as a compressed memory device in the following. The compressed memory device 500 is configured to compress data in main memory 540 either for the purpose of expanding its capacity or to increase the available bandwidth between memory controllers and memory modules for an exemplary compressed memory system. Going back to the exemplary computer system of FIG. 1, the compressed memory device 500 would typically be connected to a memory controller, for example MCTRL₁ 151, via the connections 543, 542, 549 and 525 to the compressed main memory 540 of FIG. 5, and to the last-level cache memory C3 through the connections 598, 508 and 504. Hence, it will be placed between the memory controller and the last-level cache memory. Alternatively, the compressed memory device 500 could be implemented by/integrated with the memory controller. When the device 500 of FIG. 5 receives memory write requests 504, they are first buffered in a write buffer 510. When a write request exits the write buffer at 513, the data to be written is compressed by a compressor unit 520 (CMPR) and creates a memory trans-action with compressed data 525 being sent to the main memory 540. Because data is now compressed in memory and can be of a smaller size, as depicted in FIG. 3, the requested memory block can be located in a different memory location than in an uncompressed memory system.

The location and/or the size of the compressed memory block is reflected in the compression metadata, which is read or updated by the memory compression device 500. In a similar way, the memory compression device 500 receives read requests 508. The granularity of a read request is a memory block. The memory compression device 500 must look up the metadata corresponding to the requested memory block to its location and/or its size in order to determine where the compressed data is located in the main memory 540. When this process is carried out, a read request 542 can be issued to the main memory 540. The main memory 540 will respond with compressed data 543. The memory compression device 500 decompresses it on the fly by a decompressor unit 550 (DCMPR) and returns the uncompressed memory block 554 to the requestor, as seen at 598.

Looking up the metadata before issuing the read or write memory transaction will result in delaying said read or write memory transaction. While write memory transactions are considered less critical, memory read transactions lie on the critical memory access path and must be served as fast as possible to not deteriorate the performance of the underlying computer system.

Memory compression devices have employed solutions to keep part of the metadata on-chip in a structure referred to as the Address Translation Table (ATT) 570 in FIG. 5 to accelerate the metadata lookup. This way, the most recent metadata can be stored on-chip. In an alternative embodi-ment, the more frequent metadata is kept instead. In yet other embodiments, the metadata stored in the ATT depends on the metadata fetch/eviction policy employed by the memory compression device 500.

Continuing with other units in FIG. 5, the decompressor unit 550 is attached to a Prefetch Buffer 590. To understand the purpose of the Prefetch Buffer, recall that main memory would conventionally respond to a read request with a fixed-size granularity, say 64 bytes. However, since main memory data is compressed, this may correspond to several consecutive logical memory blocks. While the requested block will be returned, it may be beneficial to keep the prefetched non-requested consecutive memory blocks. If they are accessed later, one can avoid requesting them from memory, thus saving performance loss due to the latency and memory traffic they would cause.

Assuming that compression is applied using the memory block granularity, for example, the fixed granularity which the memory is accessed at, in a first exemplary embodiment a plurality of consecutive compressed memory blocks, say X, can be potentially compacted into one block, achieving a compression of X:1. In a second embodiment, a first plu-rality of consecutive compressed memory blocks, say X, can be potentially compacted into a second plurality of blocks say Y, where X>Y achieving a compression of X:Y. Said plurality of consecutive compressed memory blocks packed together is referred to as a compressed package.

Figure 6:
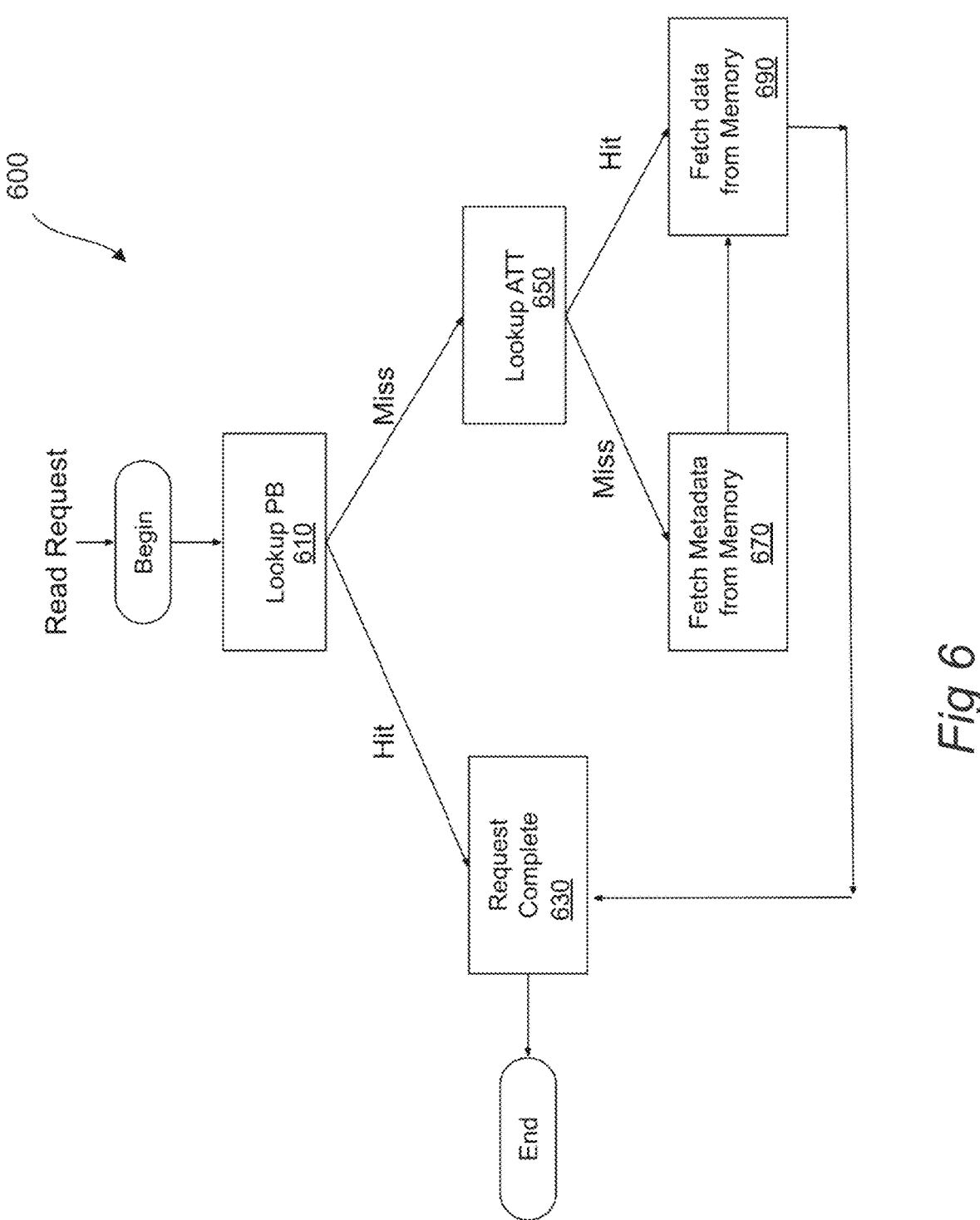
FIG. 6 depicts a flow chart for a read memory request.

FIG. 6 shows a flow chart 600 of a memory read request 508 for the exemplary memory compression memory device 500 of FIG. 5. The Prefetch Buffer (PB) 590 in FIG. 5 is first looked up at 610. If the requested data is found then the request can be served immediately with the uncompressed data 598 in FIG. 5 from the PB—i.e., the request is com-pleted at 630. If the data is not in PB then the ATT 570 in FIG. 5 has to be looked up for the metadata at 650 as depicted in FIG. 5 by a read request 508 being sent to the ATT 570 in FIG. 5. On the other hand, if the ATT does not contain the metadata for the requested memory block, then the read request 542 will be issued to main memory to fetch the compressed memory data at 690 and then respond to the request (sequence of 543, 554 and 598 in FIG. 5). In case of an ATT miss, the metadata for that page must be first fetched from memory at 670; a metadata request 547 in FIG. 5 is required. After the metadata 549 arrives in the memory compression device 500 and is used by the memory com-pression device 500 to determine the location of the com-pressed block, the request 542 in FIG. 5 can now be issued to memory for the requested data at 690. When that request is finished and the data arrives in the memory compression device 500, the request can be completed at 630 (sequence of 543, 554 and 598 in FIG. 5).

In a compressed memory system, memory traffic is reduced and performance can be improved when a fraction of memory requests is served without accessing the memory for data or for metadata. In the embodiment of the memory compression device 500 according to FIG. 5, metadata for a page is fetched and cached in the ATT when there is an ATT miss for that page. This may cause one or a plurality of memory transactions. However, if during the lifetime of the metadata in the ATT, there will not be a single hit in the Prefetch Buffer 590 of FIG. 5 for a block belonging to said page, it means that the extra traffic to fetch metadata will not be offset yielding a higher traffic than in a conventional system without prefetching. On the other hand, a single hit in the Prefetch Buffer for a block belonging to said page will offset the extra traffic, assuming a single memory transaction suffices to bring the metadata, and the more PB hits to said page, the more traffic is saved.

Pages that are subject to causing extra traffic when fetch-ing their metadata are referred to as random-access pages. Block accesses to random-access pages typically exhibit poor spatial locality. For example, assume that all blocks of a page are compressed by a factor of four. Then four blocks will be fetched into the Prefetch Buffer on a miss in the Prefetch Buffer. If none of the next consecutive address-wise three blocks are ever accessed, there is no traffic saving. In this example, if only every fourth block of said page is accessed the benefits from compressing the page is lost. In fact, if the page were not compressed, it could be located without metadata by simply bypassing the ATT.

The present disclosure presents systems, devices and methods to characterize and detect random-access pages and as a mitigation strategy selectively compress data in a compressed memory system only for pages not being ran-dom-access pages, called non-random-access pages. In essence, the compression of pages will not only be decided solely based on the data compressibility but also based on the aforementioned characterization. This improves the effi-ciency of memory compression systems as memory blocks belonging to random-access pages that do not benefit from compression are left uncompressed and can incur less or no performance penalties due to the metadata accesses. The present invention also discloses devices and methods for determining which pages should be compressed and which pages should be left uncompressed; the latter are handled through a path that is different from the one used by the compressed data. These pages are referred to as bypassed pages because they essentially bypass the largest part of the memory compression device.

A first part of the disclosure will be devices and methods for characterizing memory data based on the spatio-temporal locality of the requests, which access this data, and determine if a page shall be deemed as a random-access page or not.

In such an exemplary embodiment of the memory compression device, determining whether a page shall be deemed random access can be done using the memory structures of the memory compression device 500 of FIG. 5, such as the Address Translation Table (ATT) 570 and the Prefetch Buffer (PB) 590. However, since these structures cannot be of infinite size, the amount of requests that hit in the PB and/or in the ATT depends on the spatio-temporal locality of the requests at the data granularities at which the PB and the ATT are organized. Hence, characterizing the access pattern for a memory page as random access or not needs to take into account the locality exhibited by both the PB and the ATT.

In a first embodiment of a memory compression device both PB and ATT could be built like caches, although other alternative embodiments can be realized by those skilled in the art.

In this exemplary embodiment, the PB is organized in memory blocks, each of size say 64 bytes since this is the typical granularity of a memory access. Alternatively, the PB can be organized in cache lines since the master module that issues memory requests in the computer system is the cache hierarchy of the computer system and specifically C3 in the example computer system embodiment of FIG. 1. Cache lines can match memory blocks in size but they can also be of different sizes. As another alternative, the granularity of the PB can be larger than a cache line or memory block and it can match the packing granularity of compressed data, e.g., the size of a compressed package as previously defined, e.g., 2 memory blocks, 4 memory blocks etc.

In a second exemplary embodiment, one ATT entry can store the metadata of one memory block. Although this could result in a potentially good hit ratio of the ATT space, the ATT would not be area efficient because the size of a tag array would be larger or equivalent to the size of the data array. (The concept of a tag array will be explained later in this document.) In one alternative of an ATT structure, the metadata stored for each memory block, assuming its size is 64 (=26) bytes, is 7 bits to be able to code any compressed block size including the size of the uncompressed block. Alternatively, the metadata stored for a memory block could contain both the size and the location (42+7), assuming a physical address width of 48 bits. The tag array of the ATT, which is used to keep control information of the stored data, i.e., the memory address in the uncompressed address space would also allocate 48 bits per ATT entry (48-6+1(valid)+ 1(dirty)+4(rep1)). Moreover, fetching metadata would cause a bad utilization of the memory traffic because each metadata access would result in a waste of memory traffic, i.e., to discard 473 bits out of the 64B memory block and keep only 49 bits for the requested metadata.

In an alternative embodiment, metadata is organized using a larger granularity. In an exemplary embodiment, the metadata of N consecutive memory blocks are organized together. This way the memory location metadata does not need to store the whole address in the memory address space for each memory block but instead an offset from the beginning of this sequence of N memory blocks. This organization of metadata of several memory blocks together also matches how the Translation Lookaside Buffer (TLB) organizes the translation from the virtual to the physical address space. This embodiment is referred to as the ATT organization of metadata in pages.

Characterization of an Already Compressed Page and Random-Access Page Prediction Embodiments In this first embodiment of a memory compression device as presented herein, the target is to characterize the spatio-temporal locality of already compressed pages and predict whether one or a plurality of said compressed pages are random-access pages. Said characterization is done by tracking a page while it is resident in the ATT until eviction. For example, when a page is accessed for the first time it will be fetched into the ATT. Accessing memory blocks belonging to this page will cause the requested blocks and potentially other consecutive memory blocks to be fetched into the PB. If the page is evicted from the ATT without having any PB hits to blocks belonging to said page then that page is considered a random-access page since the traffic it causes is higher than what it would be if it was not compressed. If, on the other hand, the access pattern of a page shows good spatial and temporal locality, for example a page in which blocks are read consecutively, then it will be accessed many times while in the ATT and have the potential for many PB hits. Doing the characterization once until the ATT eviction increases the risk of misprediction. For example, the current monitored access may not be representative for this page or the page access may go through different access phases. For this reason, it may be considered beneficial to have a plurality of monitoring phases (or windows). Here, a monitoring phase/window correspond to the lifetime of an ATT entry for a page from the point it is fetched until it is evicted, The characterization of the temporal locality of the page can be implemented in the ATT, i.e., how many times read requests hit this page. This information is not sufficient by itself. For example, if only one memory block of a page is accessed one or multiple times and all others are not accessed, this page would be predicted to be beneficial for compression, while in essence accessing this one memory block would incur overheads because of the metadata access. Importantly, the prediction can be accurate if the spatial locality within the page is factored in. The spatial-locality characterization can be extracted by tracking the hit count of a compressed package, as previously defined, for each compressed package in the characterized page. For example, if a compressed package contains four potential memory blocks then accessing one of said four blocks would result in fetching the compressed package from memory and inserting it into the PB. The hit count of the compressed package is 0 upon the insert. Any subsequent access to said compressed package is treated as a hit, incrementing said hit counter. This way, stride memory accesses which access only one memory block per compressed package, as in the example previously presented, in a page will result in a random-access page prediction, which would be accurate. Said spatial locality characterization could have been implemented in the PB, however there are limitations. i) The PB may not necessarily fetch all potential blocks of the compressed package, as this is subject to the actual data compression. For example, if the demanded block is uncompressed, then only said block is fetched. Fetching the extra memory blocks for the purpose of said characterization would incur unnecessary traffic overheads, while not fetching would result in loss of accuracy in said characterization. ii) The PB must be re-organized based on the granularity of the compressed package; otherwise, if it remains organized based on memory blocks, it will need to be looked up several times for a request, to track if at least one block of the target compressed package is present. The latter would increase the pressure on the PB.

In the exemplary embodiment of the memory compression device as presented herein, the characterization and prediction of whether an already compressed page has a random-access pattern, as defined above, is done using the ATT structure and introducing a new data structure, which is referred to as Shadow-Tags (ST). In alternative embodiments, someone skilled in the art realizes that the ST can be replaced by the PB by being aware of the limitations mentioned in the previous paragraph or by addressing one or a plurality of them.

Figure 9:
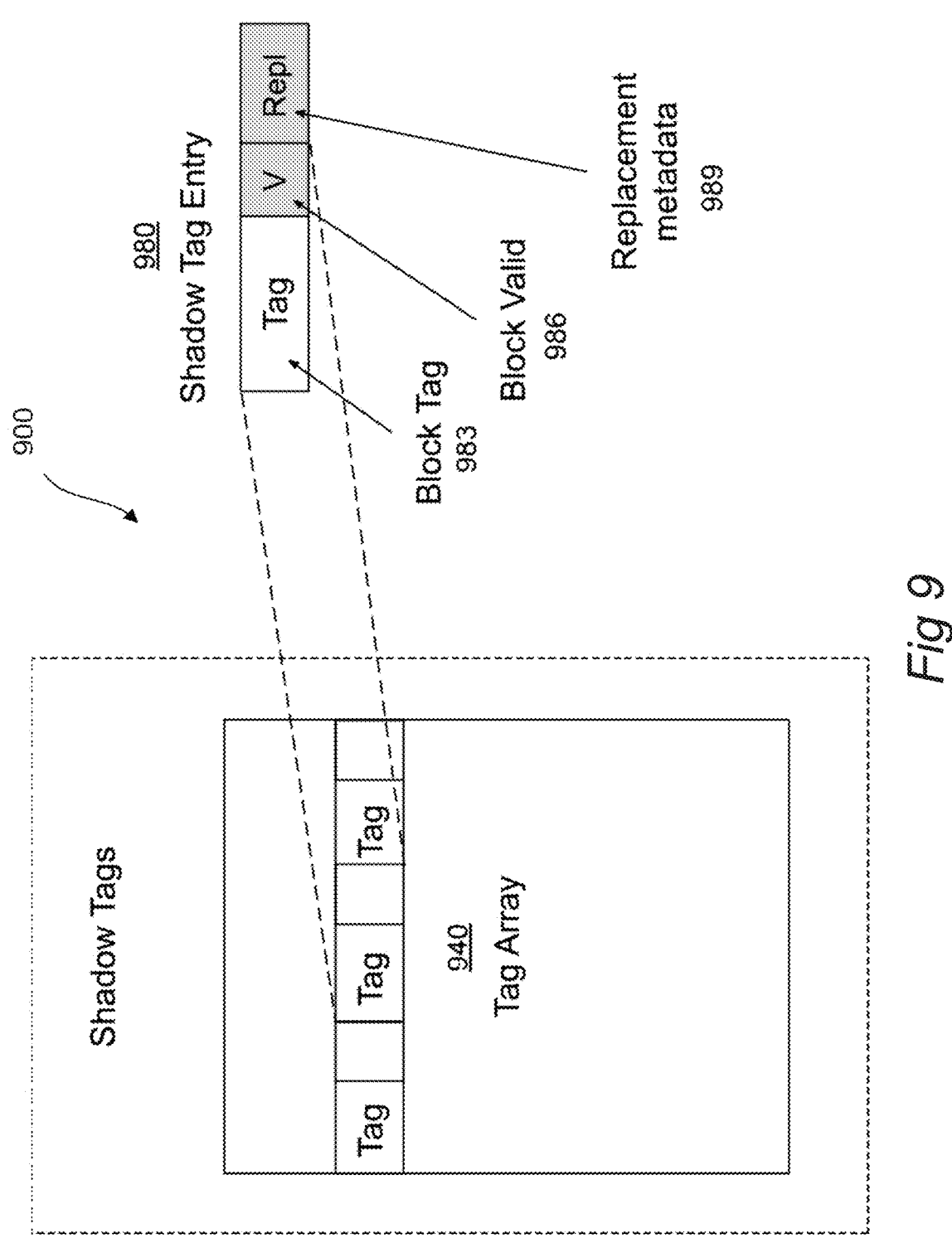
FIG. 9 depicts a shadow tag structure.
Figure 10:
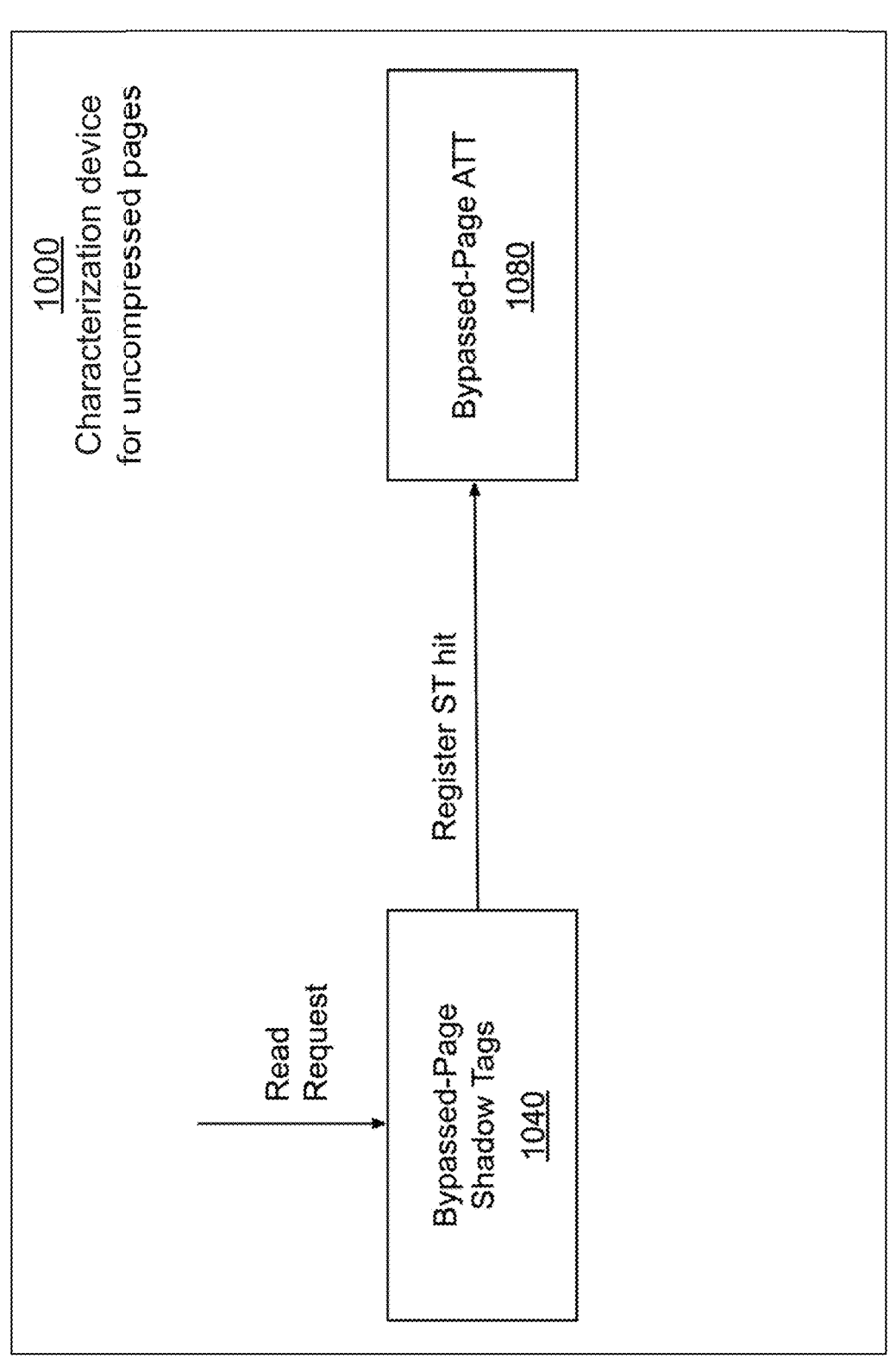
FIG. 10 depicts a device for characterization of uncompressed (bypassed) pages.
Figure 17:
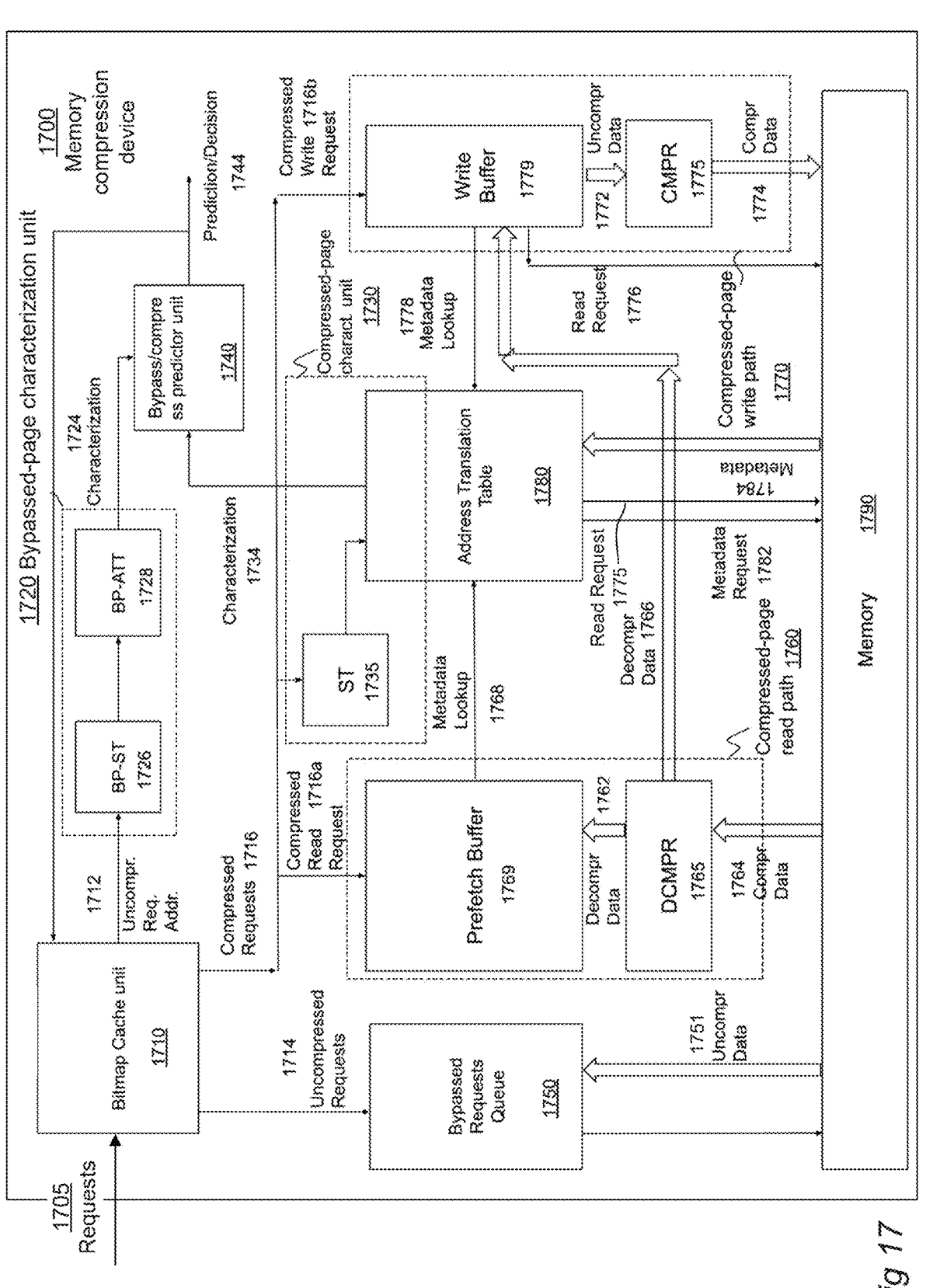
FIG. 17 depicts an embodiment of a memory compression device.

An exemplary embodiment of the ST structure is depicted at 900 in FIG. 9. The ST 900 can be organized like a cache but it contains only a tag array 940 that virtually marks a memory block as present in the ST without a need to actually fetch said memory block from memory. This makes it possible to emulate the presence of memory blocks in the memory compression device by mimicking the behavior of the PB, but without paying the overheads of transferring the data from memory. Said tag array 940 consists of a plurality of entries. Each entry 980 in the tag-array 940 keeps information about a compressed package (i.e., a plurality of consecutive memory blocks) mapped to said entry and further consists of a block tag 983, i.e., the address of said plurality of memory blocks, a valid bit 986 and replacement bits 989. The replacement bits are used to locate a victim ST entry and replace it, if the ST is organized as a set-associative cache structure. The ST is placed on the read request path before the ATT. This is illustrated in FIG. 17 (ST 1735), as part of the memory compression device disclosed in this patent.

The existing ATT structure is further extended with one or a plurality of counters for every ATT entry, i.e., a page, to register how many shadow tag hits this page has until it is eventually evicted from the ATT. Each counter is associated with one monitoring phase (or window)—as defined in a previous section of this document—and tracks the measured ST locality of the compressed packages of their associated pages: Every time a read request arrives to the memory compression device, the ST is updated to update its statistics. If a request leads to a shadow tag hit, then the counter associated with the current monitoring window in the ATT is incremented.

Figure 7:
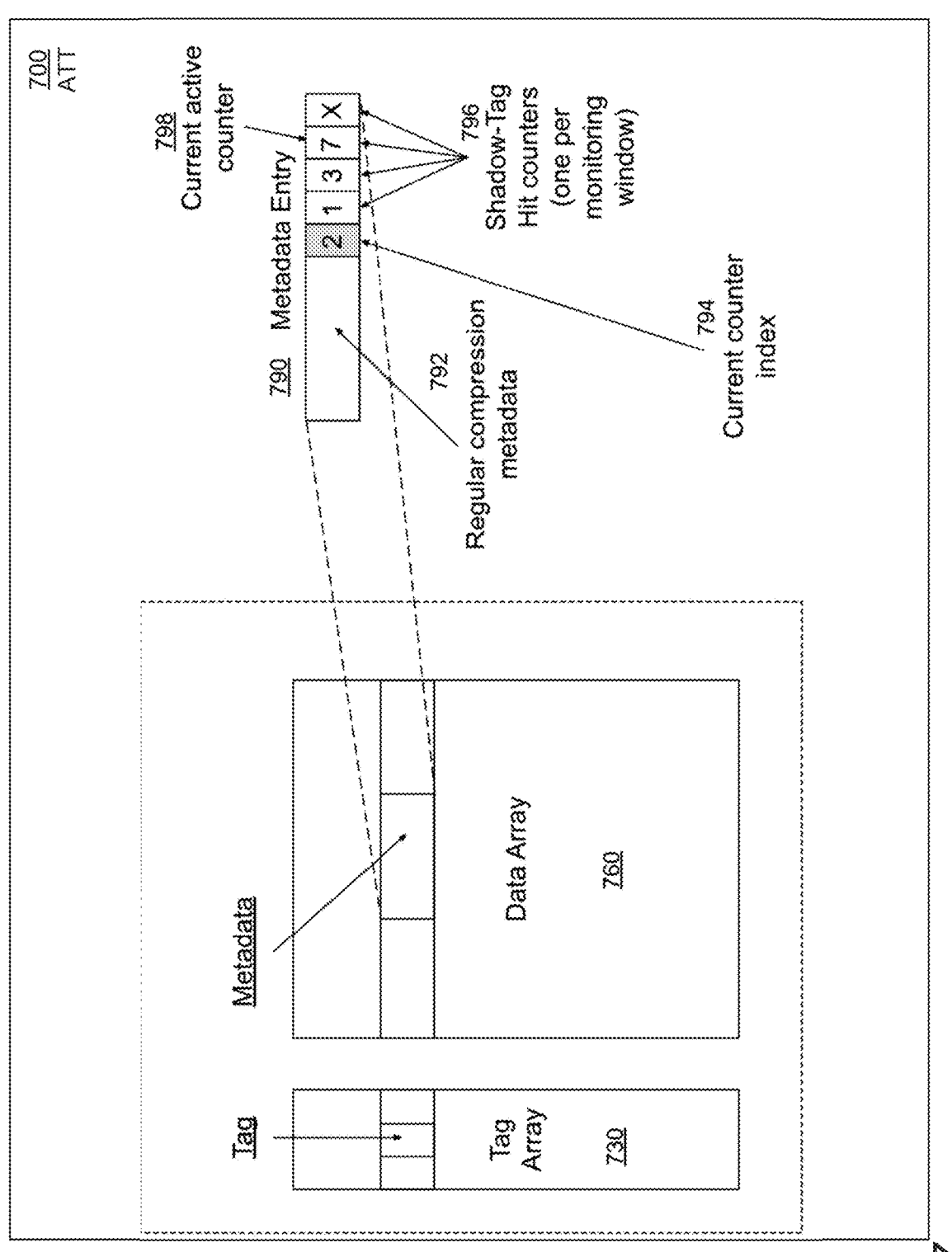
FIG. 7 depicts a device for a modified address translation table, ATT.

The modified ATT is depicted at 700 in FIG. 7. It consists of a tag array 730 and a data array 760. A tag array entry contains the control information of each page, such as the tag, a portion of the page address in the uncompressed address space, a valid bit, a dirty bit, and replacement policy bits while the data array stores the various metadata entries fetched from memory. A metadata entry 790 in the data array 760 is composed from regular compression metadata 792, e.g., the location of memory blocks, size of memory blocks, etc, and one or a plurality of counters (one per monitoring window) 796 for recording the number of shadow tag hits. In one embodiment of the memory compression device, the metadata entry could contain only one counter to record the number of ST hits in the last eviction (i.e., one monitoring window). In alternative embodiments, a plurality of N counters is used to record the ST hits for the N last evictions, i.e., a plurality of monitoring windows or a monitoring history. In this latter embodiment, a current counter index 794 is needed to determine the last valid counter value, or the number of ATT evictions so far, so that the ATT knows which counter to update in the current monitoring window. For example, in the embodiment of FIG. 7, a current active counter 798 until the next eviction has the value of 7 as indicated by a counter index 794 of 2 and starting counting the counter values from left to right from the index of 0.

Figure 8:
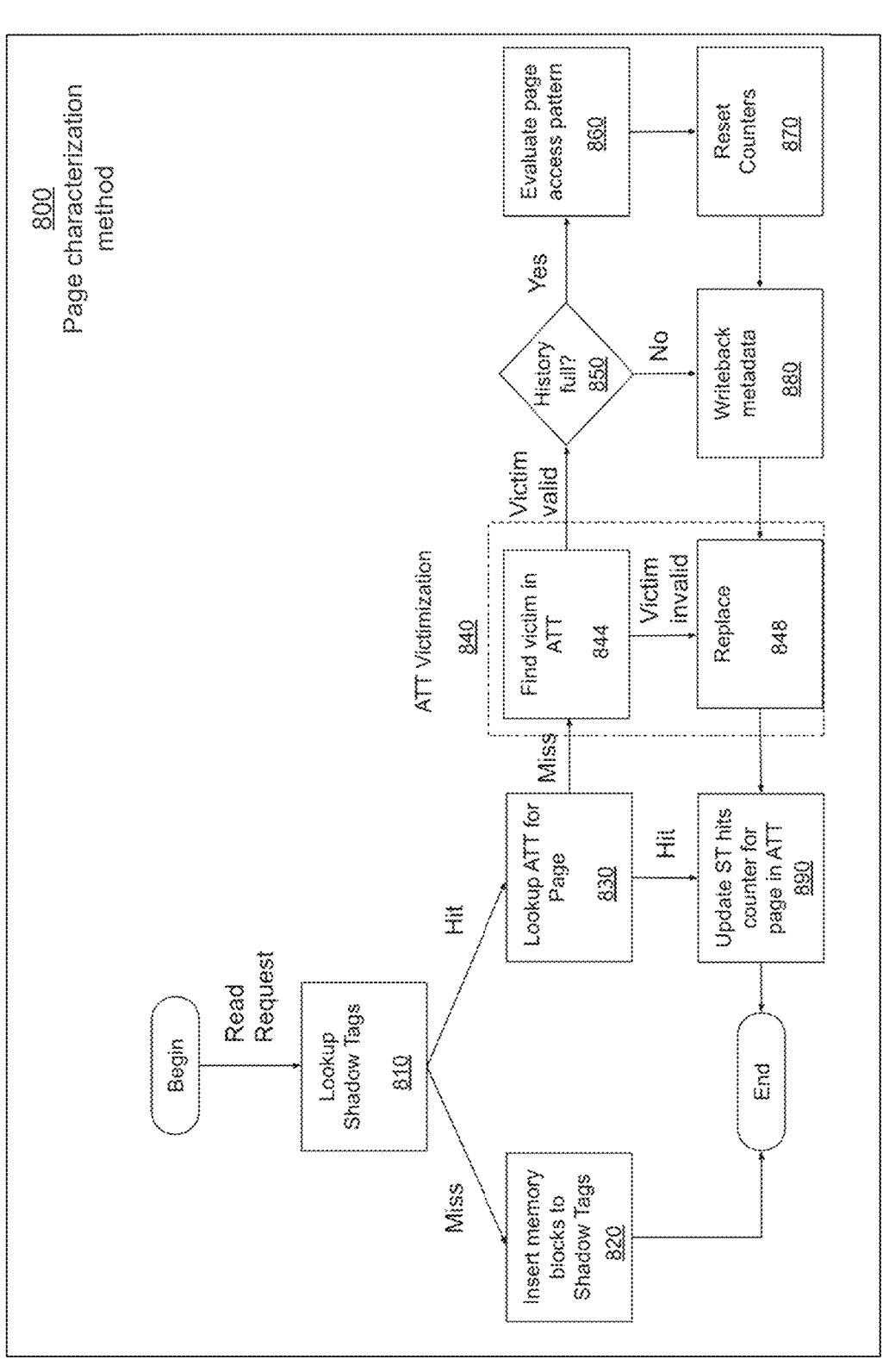
FIG. 8 depicts a method for page characterization for already compressed pages.

FIG. 8 shows an exemplary embodiment of a characterization method 800 for already compressed pages. For a read request, the ST is looked up at 810. If it is an ST miss, the compressed package associated with the requested memory block is inserted into the ST at 820, otherwise, the ATT is looked up for the page associated with the read request. If it is a hit in the ATT, the last valid ST hit counter of the ATT entry is incremented at 890. If it is a miss in the ATT, a victim ATT entry must be identified at 840. If the victim is invalid (i.e., valid bit for this ATT entry is '0' in the tag array), it is replaced by inserting the missing ATT entry from memory at 848. The process is finalized by updating the ST hit counter in the ATT at 890. On the other hand, if the victim is valid, it is checked whether the history of the ST hit counters is full, i.e., all counters have been used. If not, the metadata entry is written back to memory at 880 as usual and is replaced with the new ATT entry at 848, as described before. On the other hand, if the ST counter history is full, the history is evaluated at 860 by a page prediction method, some embodiments of which will be described in the following paragraphs. Completing first the description of FIG. 8, the ST counters of the page are reset at 870, and the ATT entry is written back to memory at 880 following the other steps described previously.

When the number of ATT evictions for a page reaches the history threshold, for example 4 evictions/monitoring windows, the values of the ST hit counters recorded in the ATT metadata entry are examined by the page prediction method, to evaluate the spatio-temporal locality of the page. The ST-hit counter-values can be examined in various ways to detect whether a page shall be deemed to be uncompressed or compressed.

In one embodiment of the page prediction method, the evaluation of the ST hit counters can be implemented as a heuristic which averages the number of ST hits per ATT eviction; if this average is higher than a threshold then the page locality is classified as being not a random-access page and the page can remain compressed in memory. If the average number of ST hits per eviction is lower than that threshold then the page is classified as a random-access page and the page must be decompressed and bypassed from now on. The threshold can be predefined. In an alternative embodiment, the threshold can be updated dynamically. In yet another embodiment, hysteresis points can be introduced to filter out outliers.

In a second embodiment of the page prediction method, the evaluation of the ST hit counters can be implemented as a heuristic which averages the number of ST hits per ATT eviction and compares this to high and low watermarks.

In a third embodiment of the page prediction method, if all the ST hit counters 796 are in use, the ST hit counter values can be averaged and stored in one of the ST hit counters allowing the rest of the hit counters to be reused for more measurements. The current counter index must be reset to 0. This can allow prolonging the characterization phase for this page.

In a fourth embodiment of the page prediction method, the heuristic could implement a low and high cut off instead of an average. For example, a page that shows 64 ST hits once might be considered to not be a random-access page even if the average is low for a number of monitoring windows; or, as an alternative, a page that shows 0 ST hits once might be considered to be a random-access page even if the average values of other windows are slightly better.

In a fifth embodiment of the page prediction method, the heuristic could implement a combination of using averages and low/high cut offs to be able to filter out outliers or to bias towards a specific access pattern. This implementation can allow for more flexibility depending on the used policy.

In the corresponding device, the plurality of ST counters can be selected to be a power of 2 so that the division operation of the average function is implemented instead as a shift operation.

Other alternatives can be realized by someone skilled in the art and the intent is to contemplate all of them.

The aforementioned exemplary embodiments for characterizing already compressed pages and predicting whether they are not random-access pages, thus remain to be compressed, or random-access pages, thus remain to be uncompressed, rely on profiling read requests. This is because read requests are in the critical path; as a result, computer performance is in general improved by improving the performance of read requests.

In an alternative computer system where write requests are more critical than read requests, the write requests can be characterized instead. In yet another alternative embodiment, both read and write requests can be profiled. This may result in better accuracy for the characterization and prediction. In yet another embodiment, a sampling of read and/or write requests can be preferred to be used for the characterization and prediction. This can be selected to only make a decision for selective compression for the sampled pages or generalize the decision to a global one; i.e., decompress all pages from now on if the prediction finds that compression should not be preferred or maintain the pages compressed if the prediction finds that compression should be preferred.

The method and devices disclosed characterize pages that are already compressed and detect whether one or a plurality of these pages must be decompressed to not harm the performance. Pages that are marked as random-access pages and are decompressed will be filtered out, however their behavior can change, thus the reverse transition is also required.

Characterization of an Already Uncompressed Page and Non or Random-Access Page Prediction Embodiments In order to characterize uncompressed pages and determine whether they have good spatio-temporal locality in order to select them for compression, new methods and devices are disclosed, which resemble the aforementioned ones with regards to some properties.

As opposed to characterizing already compressed pages using the ATT page metadata to store the history for each page in its metadata entry, characterizing uncompressed pages and predicting based on their spatio-temporal locality of whether to be deemed compressible, requires to profile pages that are currently bypassed as defined in an earlier paragraph and thus do not readily have access to their metadata.

Hence characterizing and detecting random-access pages or pages with good spatio-temporal locality, i.e. non-random-access pages for uncompressed pages require a different mechanism. This characterization device is depicted at 1000 in FIG. 10 and needs two new structures: i) a Bypassed-page shadow tag (BP-ST) 1040 and ii) a Bypassed-page ATT (BP-ATT) 1080. The BP-ST is organized similarly to the aforementioned ST of FIG. 9 and resembles its behavior. The ST tracks the spatial locality of memory blocks in the granularity of compressed packages. The BP-ST tracks the spatial locality in the same granularity supposing that memory blocks are compressed and form compressed packages even though the page is currently bypassed. On the other hand, the BP-ATT is a shadow-tag structure.

Figure 12:
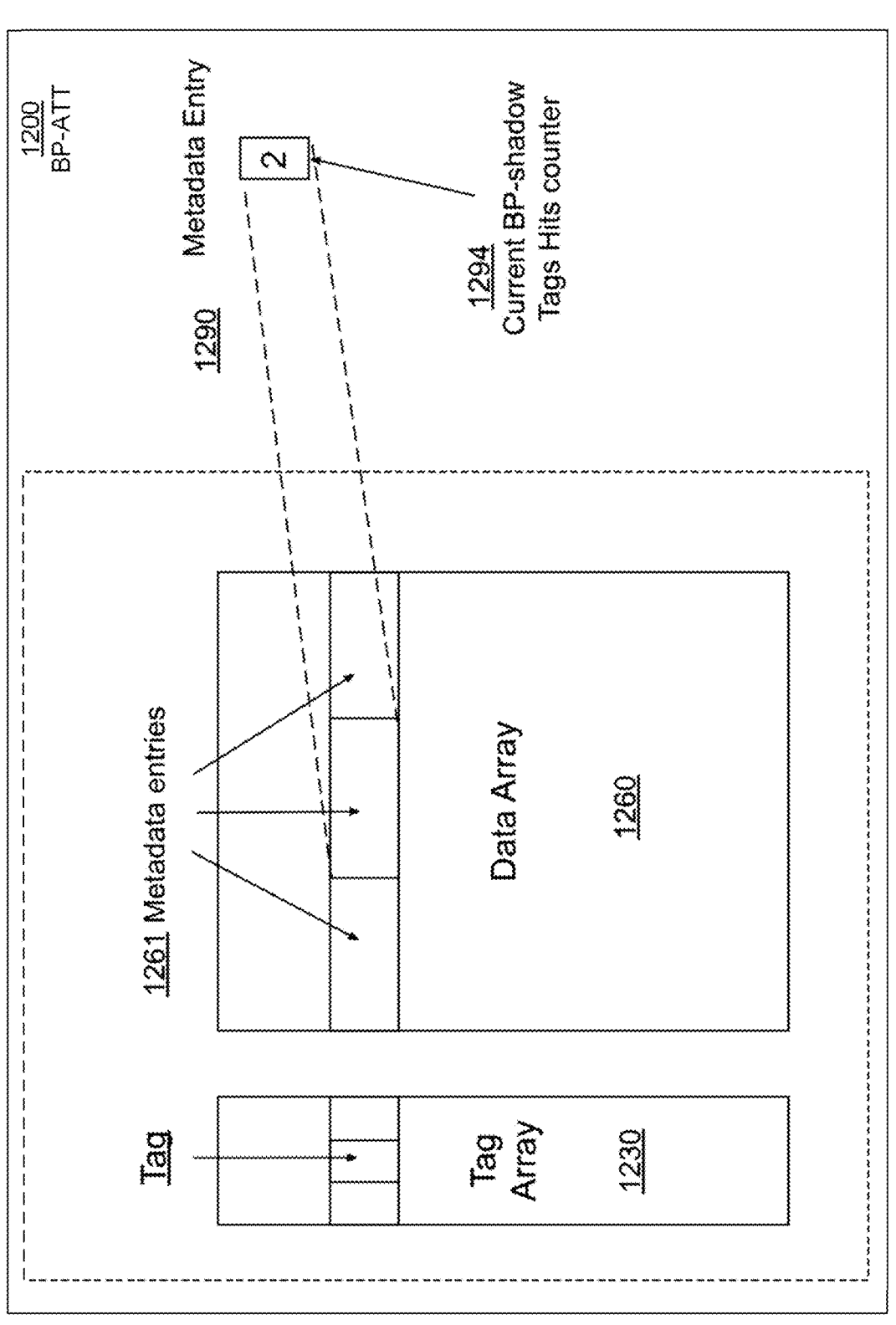
FIG. 12 depicts a first embodiment of a bypass ATT (BP-ATT) with no history.

A first exemplary embodiment of the characterization device for uncompressed pages uses the BP-ATT 1200 depicted in FIG. 12. The BP-ATT consists of a tag array 1230 and a data array 1260 in which there is a plurality of metadata entries 1261. Each metadata entry 1290, corresponding to a plurality of memory blocks organized in a page, contains one counter 1294 which is the current BP-ST hit counter for the associated plurality of memory blocks. In this case the page characterization relies only on this counter value.

Figure 11:
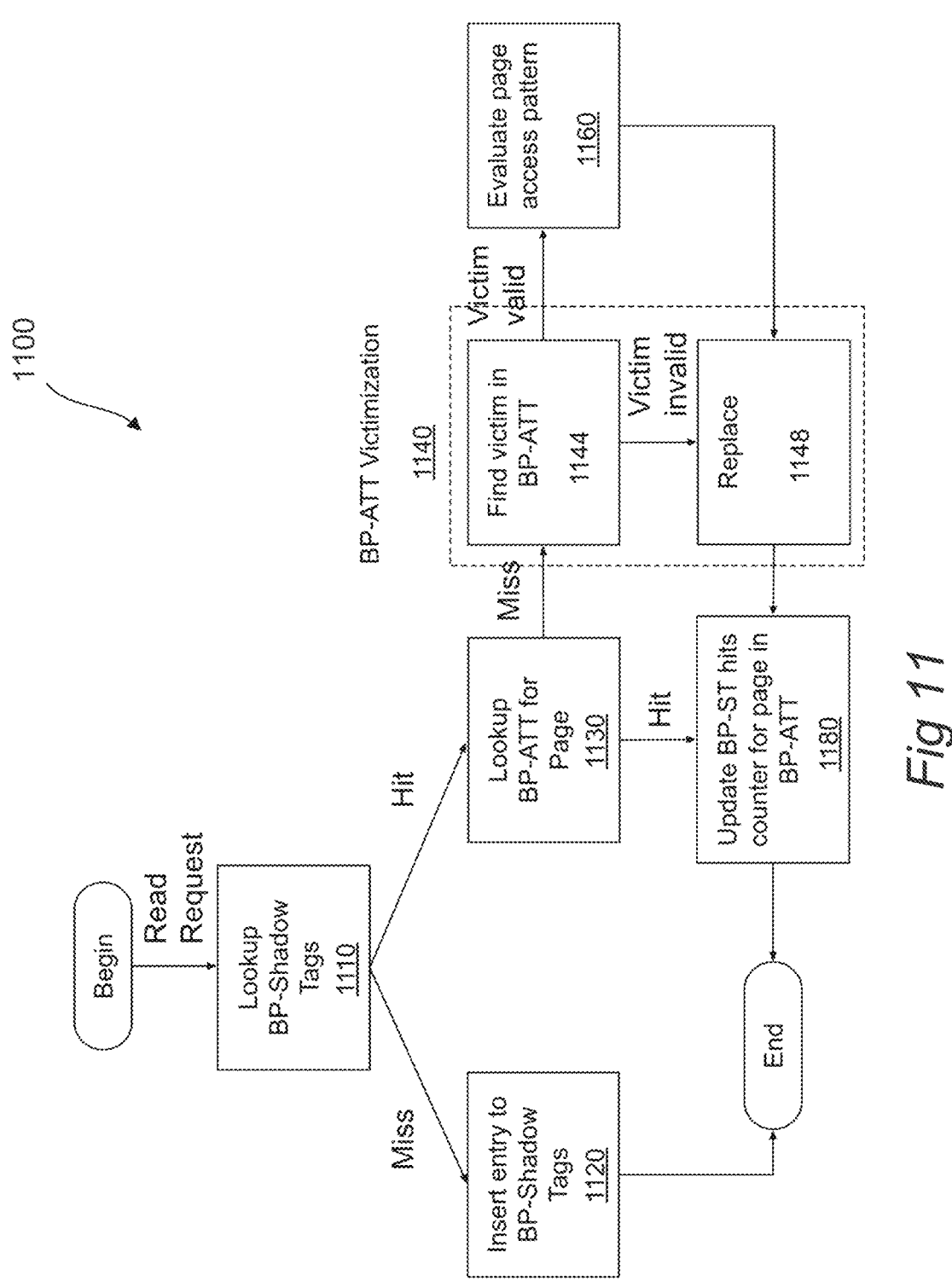
FIG. 11 depicts a method for characterization of uncompressed (bypassed) pages.

FIG. 11 illustrates a method 1100 for characterizing uncompressed pages and predicting non-random-access/random-access pages based on said characterization. A read request is first looked up in the BP-ST 1110. If it is a miss, it is inserted into the BP-ST at 1120, otherwise (BP-ST hit) it is further looked up in the BP-ATT. If the latter lookup results in a BP-ATT hit, the stored BP-ST counter 1294 of the hit metadata entry 1290 in FIG. 12 is incremented at 1180. If the BP-ATT access results in a miss, then a BP-ATT entry must be evicted at 1140. If an invalid victim is found at 1148, a new entry is created in the place of the invalid one and the BP-ST counter is initialized to 0. This does not require fetching any metadata from the memory since the characterization method and device profiles the ST activity of this metadata entry until it is evicted from the BP-ATT. The BP-ST counter is then incremented at 1180 as described previously. If a valid victim is found instead at 1144, this triggers the prediction method which needs to evaluate the page characterization at 1160. When the prediction completes, the entry can be invalidated and replaced by the new entry at 1148 as described previously.

The embodiment of the prediction method and device configured to do so decides whether the page shall be deemed as a non-random-access page, to be compressed, or a random-access page, to remain uncompressed, by comparing the value of this counter, e.g., 1294 in FIG. 12, upon the eviction of the metadata entry from the BP-ATT to a threshold. This threshold is pre-defined. In alternative embodiments, it can be defined dynamically.

Figure 13:
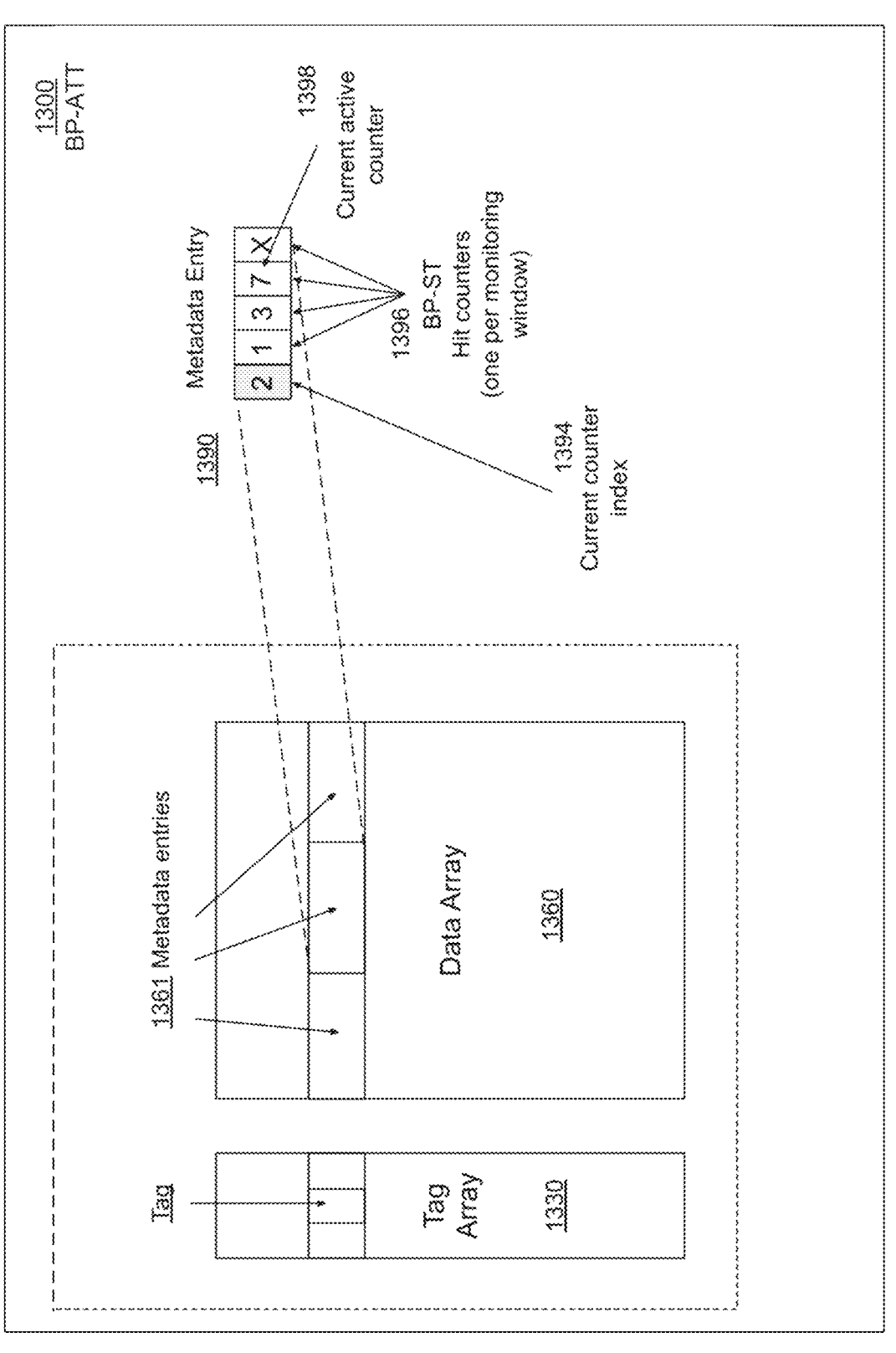
FIG. 13 depicts a second embodiment of a bypass ATT (BP-ATT).

A second exemplary embodiment of the characterization method and device contains the BP-ATT 1300 depicted in FIG. 13. As in FIG. 12, the BP-ATT 1300 is organized with a tag array 1330 and a data array 1360, but each metadata entry 1390 collects instead the ST locality history across a plurality of BP-ATT evictions, previously defined as monitoring windows. The organization of BP-ST counters 1396 and 1394 is similar to the ST counter organization 796 and 794 in the ATT of FIG. 7. This requires for each uncompressed page to store and maintain a plurality of extra metadata, which are the values of those counters. This further means that the characterization method for uncompressed pages resembles the one for compressed pages as said metadata must be read from memory upon a BP-ATT miss and written back to memory upon an eviction so that the history of previous monitoring windows is retrieved and maintained.

The aforementioned exemplary embodiments for characterizing uncompressed pages and predicting whether they are non-random-access pages, to be compressed, or random-access pages, to remain uncompressed, rely on profiling read requests. This is because read requests are on the critical path thus computer performance is in general improved by improving the performance of read requests.

In an alternative computer system, where write requests are more critical than reads, the write requests can be characterized instead. In yet another embodiment, both read and write requests can be profiled. This will result in better accuracy for the characterization and prediction. In yet another embodiment, a sampling of read and/or write requests can be preferred to be used for the characterization and prediction. This can be selected to only make a decision for selective compression of the sampled pages or generalize the decision to a global one; i.e., compress all bypassed pages from now on if the prediction finds that compression should be preferred or maintain the bypassed pages in uncompressed form if the prediction establishes that compression should not be a preferred option.

General Embodiment—Bypassing

Another device and method disclosed herein show how the previously characterized predicted non-random-access memory data, to be compressed, and random-access memory data, to remain uncompressed, is managed in a memory compression device.

Predicted random-access pages should be in uncompressed form. Said pages should preferably be bypassed without looking up their metadata every time there is a memory transaction targeting the bypassed memory data. This is because the lookup would thrash the ATT and defeat the purpose of selectively compressing the memory data that could benefit from compression.

To achieve efficient bypassing we need a new layer of metadata that holds the minimum possible information about the memory data, i.e., whether it is compressed or bypassed. The granularity of data to keep this new metadata information determines the amount of metadata.

In an exemplary embodiment, this granularity can be set to the same granularity used by the characterization and prediction devices and methods for characterizing non-random-access vs. random-access memory data; e.g., at the granularity of a memory page. One bit of metadata per page is enough to distinguish between non-random access vs random-access memory data.

Storing 1 bit of metadata for every memory page in the memory controller where the memory compression device is attached to will still lead to a plurality of bits because there is a plurality of memory pages in the memory controller if the memory capacity is large; the area resources to keep this information inside the memory compression device will not likely be sufficient. For example, the size of this metadata would be 122 KB (1M metadata bits) for a 4-GB memory attached to a memory controller, assuming a page size of 4 KB. Hence, this exemplary 1-bit metadata per page, referred to as a bitmap to store the bypass/compression state, is stored in the main memory.

Figure 14:
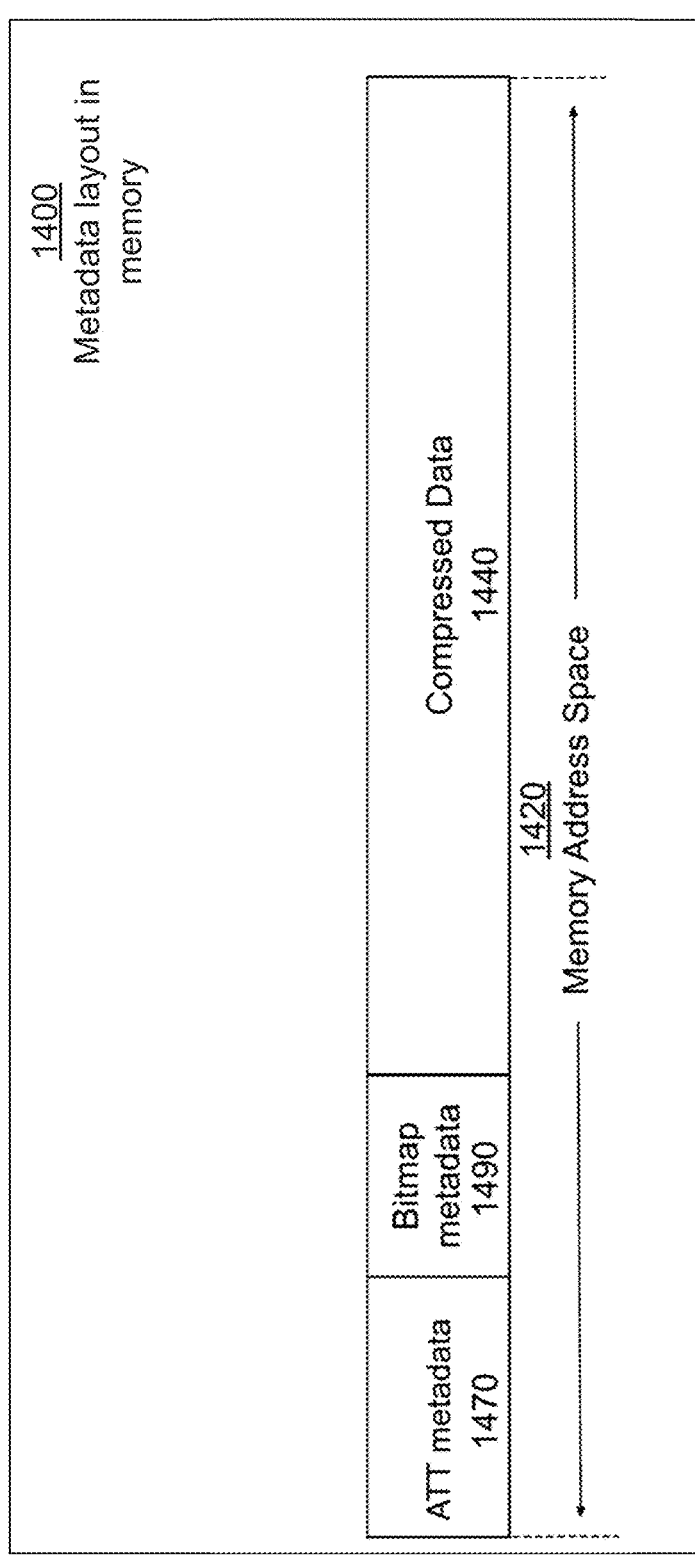
FIG. 14 depicts bitmap metadata in memory.

The metadata layout 1400 is depicted in FIG. 14. The bitmap metadata 1490 is allocated in the memory address space 1420 along with the ATT metadata 1480. This metadata is essentially a plurality of bit sequences, and therefore it is in a similar form as the plain data being compressed by the memory compression device. It is worth noting that the compressed data 1440 will contain a mix of compressed and uncompressed page data. Part of the bitmap metadata 1490 can be further cached in the memory compression device.

Figure 15:
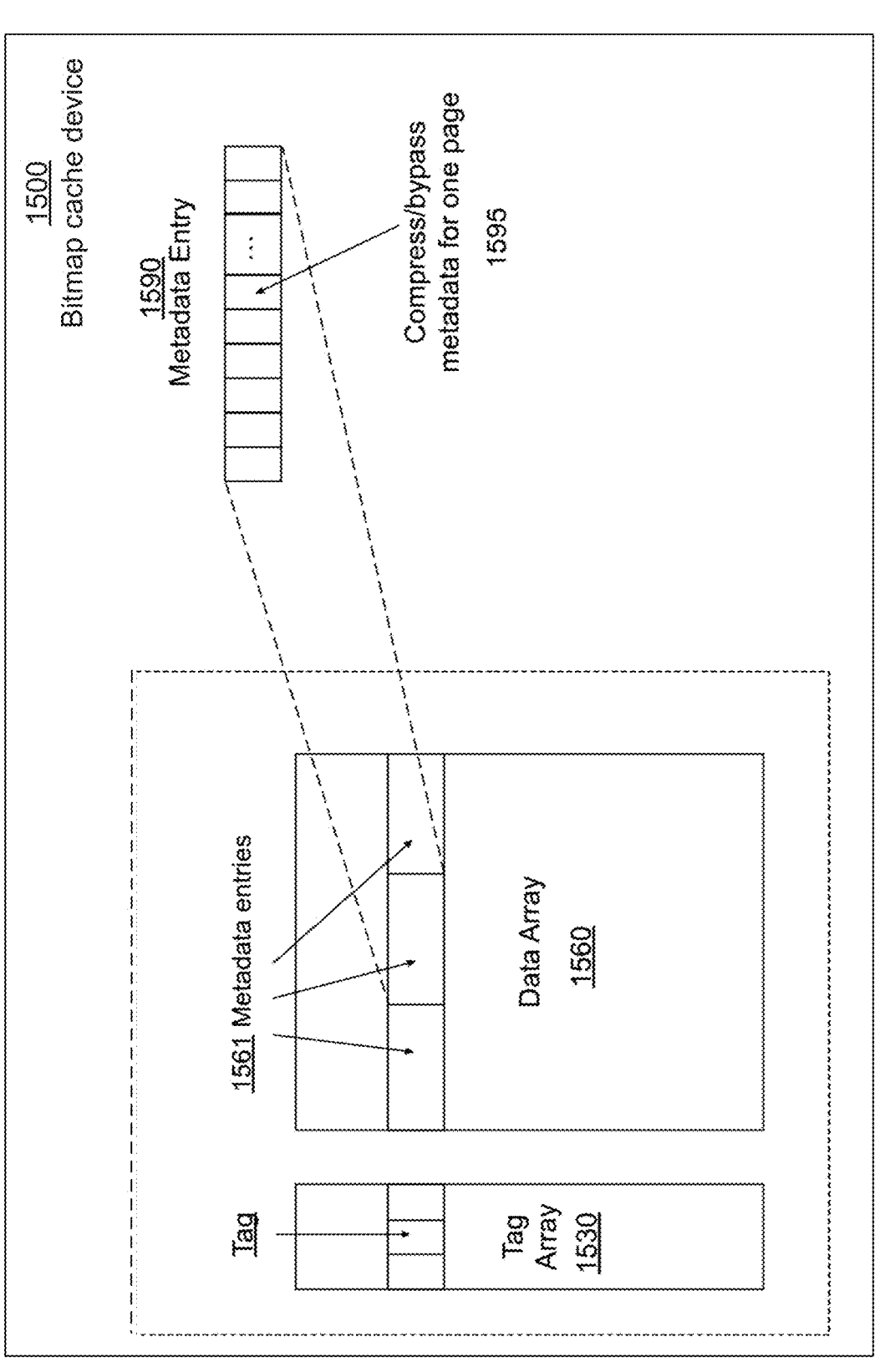
FIG. 15 depicts a device for a bitmap cache.

An exemplary embodiment of a bitmap cache device 1500 that caches the bitmap metadata is depicted in FIG. 15. This bitmap cache device contains a tag array 1530 and a data array 1560, where each bitmap cache entry contains one or a plurality of compress/bypass metadata units, where each compress/bypass metadata unit corresponds to one memory page. In this exemplary embodiment, the compress/bypass metadata unit is a single (1) bit.

Figure 16:
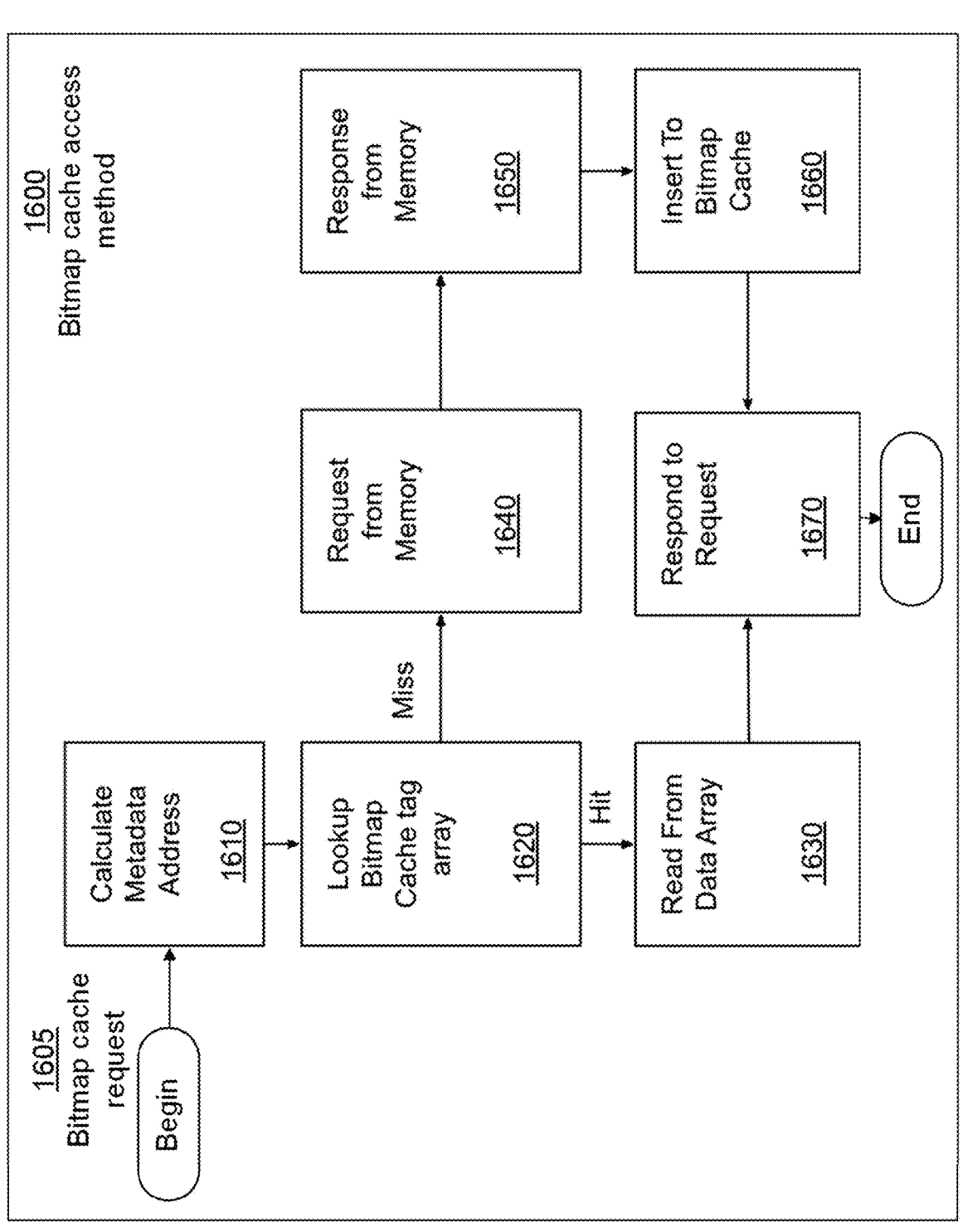
FIG. 16 depicts a method for a bitmap cache.

An exemplary embodiment of a bitmap cache access method 1600 is depicted in FIG. 16. A bitmap cache request 1605 is served as follows: First, the metadata address for the requested data request is calculated at 1610 and is used at 1620 to lookup the bitmap cache tag array (cf. 1530 in FIG. 15). This lookup might result in a hit, which means the metadata are located in the bitmap cache and they can be read at 1630 from the bitmap cache data array (cf. 1560 in FIG. 15) to respond to the request at 1670. If the lookup at 1620 results in a miss, then a request must be made to memory at 1640 to fetch the requested bitmap data. Once that request completes at 1650, the newly fetched data is inserted into the bitmap cache data array and corresponding tag array at 1660. At the same time, a response for the request that caused the bitmap cache miss can be produced at 1670.

An alternative embodiment of the memory compression device could organize the bitmap metadata not per page but per region where the region is defined as a plurality of memory pages. Using the previous example of a 4-GB memory attached to a memory controller and a memory region of 64 KB (or 16×4 KB pages), the bitmap metadata would be sized to 8 KB only (65536 regions of 1-bit each). In this exemplary embodiment, the decision for compressing or bypassing the whole memory region would require a homogeneous prediction for all pages in the region, i.e., all are characterized as compressed or bypassed. In an alternative embodiment, the prediction device and method could decide for compressing or bypassing a region based on the majority of pages within said region, i.e., if the compressed predicted pages are more than the bypassed, compress the whole region and vice versa. Alternative embodiments can be realized by those skilled in the art.

In yet another embodiment, the bitmap metadata can be organized hierarchically. This embodiment associates bitmap metadata per region and for each said region it associates bitmap metadata per page. In this embodiment, the cached metadata can be organized similarly in a bitmap cache hierarchy wherein the top-level bitmap cache caches region-based bitmap metadata and the second-level bitmap cache caches page-based bitmap metadata. This could be beneficial if there is a balanced mix of compressed and uncompressed pages. Therefore, the region is marked as compressed. Whether a page is compressed or not is indicated by the page bitmap metadata of the second level. On the other hand, if the region is marked uncompressed then all the page data in this region is uncompressed. This does not require further inspection of the page bitmap metadata.

Full Device/System Embodiments—Bypassing

An exemplary embodiment of a device 1700 for accessing compressed computer memory (short notation: memory compression device 1700) is shown in FIG. 17. The memory compression device 1700 is based on the general memory compression device 500 in FIG. 5 and has been extended with the inventive structure and functionality which has been described above with reference to the preceding drawings. Accordingly, the memory compression device 1700 comprises a bitmap cache unit 1710 (implemented, for instance, by any of the exemplary embodiments of the bitmap cache device of FIGS. 15 and 16), a characterization unit for compressed pages 1730 (implemented, for instance, by any of the exemplary embodiments of the device and method of FIG. 10-13), a characterization unit for uncompressed pages 1720 (implemented, for instance, by any of the exemplary embodiments of the device and method of FIG. 7-9) and a prediction unit 1740 (implemented, for instance, by any of the exemplary embodiments described above in the paragraphs that follow after the description of FIG. 8).

In this exemplary memory compression device 1700, memory blocks falling into bypassed pages (or regions) are selected to not go through the same path as compressed memory blocks but to be handled instead through a bypassed requests queue 1750. The benefit is two-fold. Bypassed pages are not penalized with extra latency for accessing the prefetch buffer PB 1769 and the ATT 1780 and can be issued immediately to the main memory 1790. Similarly, the data responses for bypassed memory data can be served immediately to the requestor without going through the decompressor unit 1765. Otherwise, data responses for compressed data are served as previously described. (Note that the actual data responses from the bypassed requests queue 1750 and the PB 1769 are not shown in FIG. 17 in order not to burden the illustration with excessive details.) Moreover, the PB 1769 and ATT 1780 will not be polluted with data and metadata corresponding to uncompressed memory data. By directing all the read/write traffic for uncompressed memory data through the same path, even if this is independent from the compressed path, this approach will not suffer from any memory coherency issues as long as the memory access granularity does not surpass the bypass granularity, which in this exemplary embodiment is a 4 KB page. In alternative embodiments, this granularity can be modified by those skilled in the art to adapt to the target computer system by modifying accordingly the bitmap metadata granularity and potentially the granularity at which the characterization and prediction takes place.

In the exemplary embodiment of FIG. 17, when a request 1705 arrives, the bitmap cache unit 1710 decides whether it belongs to (i.e., is directed at) a page that is compressed or a page that is bypassed. When the request belongs to a compressed page then it goes through the compression control and data path of the memory compression device, which is similar to the one of FIG. 5. When a request belongs to an uncompressed page then it is sent directly to memory 1790 through the bypassed requests queue 1750.

The blocks of uncompressed pages are located in their original addresses in the memory 1790. Hence, both read and write transactions to these blocks can be sent directly to memory 1790 without the need to lookup any metadata besides the lookup in the bitmap cache unit 1710, which happened in the previous step. The read and write transactions are sent to memory in the same order as they arrive through the bypassed requests queue 1750 to ensure data coherency.

The compressed pages are profiled for their spatio-temporal locality characterization by the characterization unit 1730 for compressed pages, so that the predictor unit 1740 can evaluate the results of the characterization unit 1730 to detect any random-access pages that must be decompressed and bypassed. On the other hand, the bypassed pages are profiled by the BP characterization device 1720. The predictor device 1740 evaluates said characterization outcome of 1720 with the goal to detect non-random-access pages that should be compressed.

When a random-access page, is detected it is decompressed and the bitmap cache unit 1710 is updated accordingly (decision 1744). When a non-random-access page is detected, it is then marked as compressed in the bitmap cache unit 1710 (decision 1744) and is compressed.

The compressed-page read path 1760, the compressed-page write path 1770, the ATT 1780 and the memory 1790 are similar to the ones of the memory compression device of FIG. 5.

Compression/Decompression Transitions

The devices and methods presented in this disclosure characterize the spatio-temporal locality of memory data based on its access pattern, predict if memory data should be compressed, should be decompressed or remain compressed/uncompressed and the marking of this state is managed by the bitmap device/method. When a prediction/decision 1744 of FIG. 17 is made for a page to be compressed or decompressed, there are various alternatives to handle this change of state for the affected memory data.

In one embodiment, the transition from one state (e.g., uncompressed state) to another (e.g., compressed state) is done gradually or opportunistically, i.e., when there is a memory write transaction that accesses all or part of the transitioned memory data, then only the part of the memory block accessed by said write transaction changes state.

In an alternative embodiment, the transition from one state to the other is done eagerly by reading the whole memory data from memory (1790 of FIG. 17). If the affected (by the aforementioned decision 1744) memory data is compressed, it must be decompressed by the decompressor unit 1765 and written back to the memory 1790. Conversely, if the affected (by the aforementioned decision 1744) memory data is uncompressed, it must be compressed by the compressor unit 1775 and written back to the memory 1790.

In a further alternative embodiment, the affected memory data can change state opportunistically or eagerly depending on the selected policy or depending on other conditions. For example, the opportunistic state transition is more beneficial when there is an excessive use of the memory bandwidth because there is no extra traffic overhead imposed. On the other hand, the eager transition can be preferred so that the state of the affected memory data changes immediately to as soon as possible reduce the overheads if it is predicted to be a bypassed page or to as soon as possible increase the benefits if it is predicted to be a compressed page.

CONCLUSIONS—GENERAL ASPECTS OF THE
DISCLOSED INVENTION

Figure 19:
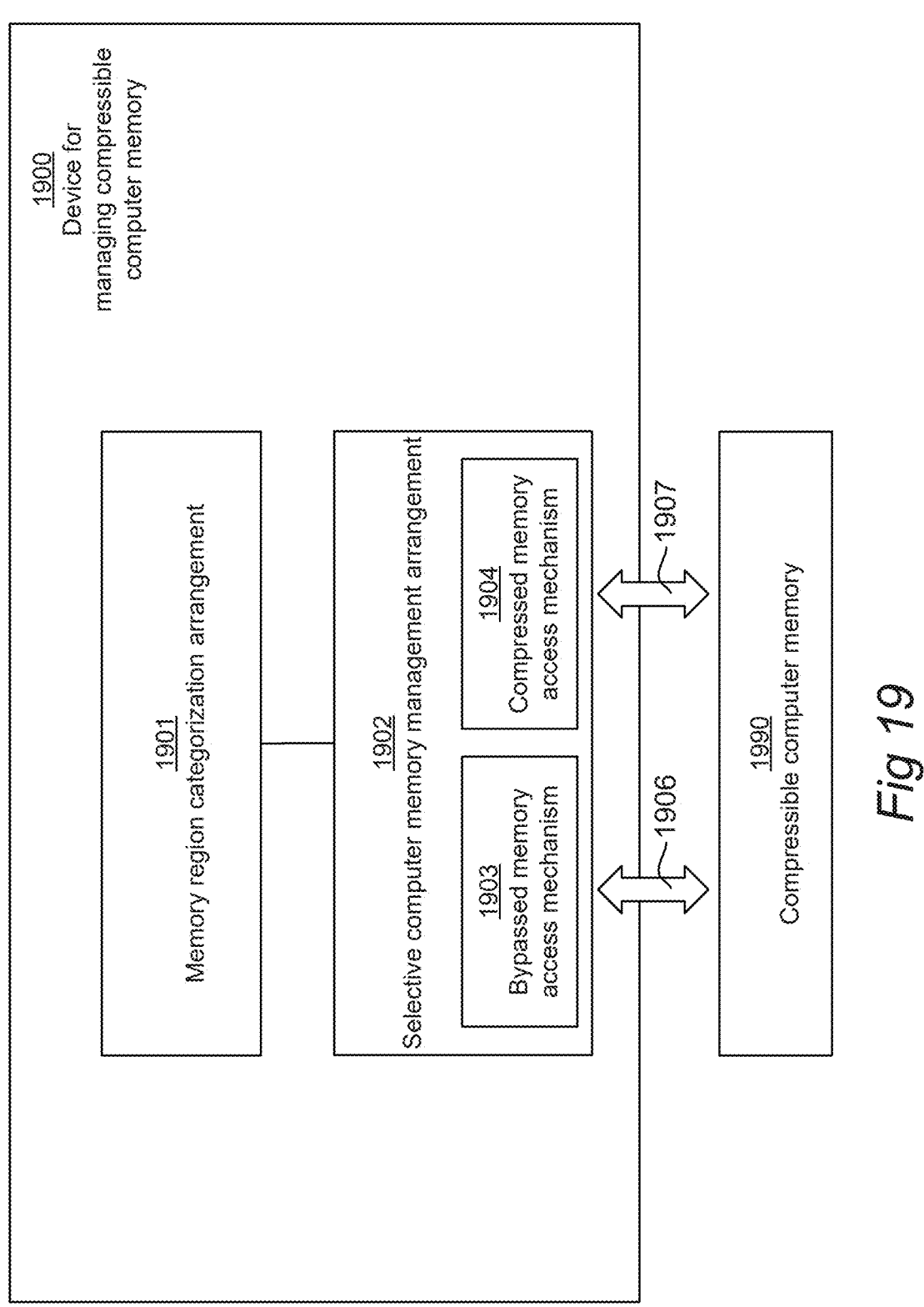
FIG. 19 depicts a device for managing compressible computer memory generally according to another aspect of the present invention.

As mentioned in the beginning of the detailed description sections, general aspects of the present invention will be understood from FIG. 18, which depicts a method 1800 of managing compressible computer memory, and from FIG. 19, which depicts a device 1900 for managing compressible computer memory.

The method 1800 in FIG. 18 is for managing compressible computer memory, such as memory 1790 in FIG. 17 or memory modules 151-153 in FIG. 1. Memory 1790 of FIG. 17 will be used from now on as a non-limiting example of the computer memory. As seen at 1810, the method 1800 comprises monitoring of memory requests (cf. 1705) in FIG. 17) to the computer memory 1790 to categorize memory regions based on spatio-temporal locality of the memory requests made to the memory regions, wherein a memory region is categorized to exhibit low spatio-temporal locality when memory requests to said memory region are less frequent than a threshold. As the skilled person will understand, depending on implementational considerations, the threshold may define the maximum number of memory requests to said memory region (or more specifically, to any memory contents belonging to said memory region) during a given time period for said memory region to be categorized as exhibiting low spatio-temporal locality. In other words, if the number of memory requests to said memory region during said given time period exceeds said value, then said memory region is not categorized to exhibit low spatio-temporal locality. The threshold may be a static value or a dynamic value. Likewise, the time period may be statically defined (i.e., predefined) or dynamic. This applies also to the device 1900 in FIG. 19.

As seen at 1820, the method 1800 further comprises selectively managing the compressible computer memory depending on categorization, such that memory contents of memory regions categorized to exhibit low spatio-temporal locality are stored (cf. 1830 in FIG. 18) in uncompressed form in the computer memory 1790, whereas memory contents of memory regions not categorized to exhibit low spatio-temporal locality are stored (cf. 1840 in FIG. 18) in compressed form in the computer memory 1790.

The device 1900 for managing compressible computer memory 1990 in FIG. 19 correspondingly has a memory region categorization arrangement 1901 configured to monitor memory requests (cf. 1705 in FIG. 17) to the computer memory 1990 (cf. 1790 in FIG. 17), and to categorize memory regions based on spatio-temporal locality of the memory requests made to the memory regions, wherein a memory region is categorized to exhibit low spatio-temporal locality when memory requests to said memory region are less frequent than a threshold. The device 1900 further has a selective computer memory management arrangement 1902 which is operatively connected with the memory region categorization arrangement 1901. The selective computer memory management arrangement 1902 comprises a bypassed memory access mechanism 1903 and a compressed memory access mechanism 1904.

The bypassed memory access mechanism 1903 may, for instance, include, be implemented by or correspond to the bypassed requests queue 1750 in FIG. 17. The bypassed memory access mechanism 1903 is configured to handle (see 1906 in FIG. 19) memory contents of memory regions categorized to exhibit low spatio-temporal locality in uncompressed form in the computer memory 1990.

The compressed memory access mechanism 1904 may, for instance, include, be implemented by or correspond to the read path 1760, write path 1770 and address translation table 1780 in FIG. 17. The compressed memory access mechanism 1904 is configured to handle (see 1907 in FIG. 19) memory contents of memory regions not categorized to exhibit low spatio-temporal locality in compressed form in the computer memory 1990.

As should be clear from the foregoing detailed description, each memory region will typically constitute a memory page in the computer memory (or alternatively a sequence of contiguous memory pages in the computer memory, depending on implementation). Each memory page comprises a number of memory blocks. Compressed memory contents is retrievable from the computer memory as a compressed package which consists of a number of compressed consecutive memory blocks compacted into one physical memory block. A memory region will typically be considered as exhibiting low spatio-temporal locality when the number of memory requests to memory blocks that belong or would belong to the same compressed package is below a threshold. Such a memory region has been referred to as a "random-access page" in the preceding description.

Alternatively, a memory region will typically be considered as exhibiting low spatio-temporal locality when a first memory request to a memory block in the memory region is not followed, within a monitored time period, by a second memory request to a second memory block that belongs or would belong to the same compressed package. As will be clear from the above, retrieval of compressed memory contents typically involves use of an address translation table ATT, 1780 for mapping physical (uncompressed) locations of memory contents of the memory regions in the computer memory to compressed locations of memory contents of the memory regions in the computer memory. Typically, the monitored time period is a time window from fetching of address translation metadata for the memory region into the address translation table until eviction of said address translation metadata from the address translation table. The monitored time period may advantageously further include one or more historic time windows from fetching to eviction of the address translation metadata for the memory region.

The device 1900 in FIG. 19 may further comprise a categorization handling arrangement (cf. 1710 in FIG. 17) configured to receive a memory request 1705 pertaining to a certain memory region, determine the categorization of the certain memory region, and cause selective processing of the received memory request 1705 depending on the determined categorization as follows. When the determined categorization of the certain memory region is not low spatio-temporal locality (i.e., the certain memory region is not a random-access page), the received memory request 1705 will be handled as a compressed memory request (cf. 1716 in FIG. 17) by invoking the compressed memory access mechanism 1904 (e.g. units 1760-1780 in FIG. 17) to retrieve 1907 requested compressed memory contents from the computer memory 1990 (1790). When, on the other hand, the determined categorization of the certain memory region is low spatio-temporal locality (i.e., the certain memory region is a random-access page), the received memory request 1705 will be handled as an uncompressed memory request (cf. 1714 in FIG. 17) by invoking the bypassed memory access mechanism 1903 (e.g. unit 1750 in FIG. 17) to bypass the compressed memory access mechanism 1904 (1760-1780) and retrieve 1906 requested memory contents in uncompressed form directly from the computer memory 1990 (1790).

Advantageously, the compressed memory access mechanism 1904 (1760-1780) further comprises a prefetch buffer (cf. 1769 in FIG. 17) and is configured to handle the compressed memory request 1716 by checking (cf. 610 in FIG. 6) whether requested memory contents exist in decompressed form in the prefetch buffer 1769. If so, the mechanism 1904 will respond (cf. 630 in FIG. 6) to the received memory request 1705 with decompressed memory contents from the prefetch buffer 1769. If not, the mechanism 1904 will retrieve (cf. 650 and 670 in FIG. 6, and 1768 and 1782 in FIG. 17) metadata, required for the retrieval of the requested memory contents, either from an address-translation table (cf. 1780 in FIG. 17) or, if unavailable in the address-translation table 1780, from the computer memory 1990 (1790); then retrieve (cf. 690 in FIGS. 6 and 1775 in FIG. 17) the requested memory contents in compressed form (cf. 1764 in FIG. 17) from the computer memory 1990 (1790) using the retrieved metadata; decompress (cf. 1765 in FIG. 17) the retrieved memory contents; and finally respond (cf. 630 in FIG. 6) to the received memory request 1705 with the decompressed memory contents (cf. 1762 in FIG. 17).

As has been described above for the embodiment in FIG. 17, the categorization handling arrangement 1710 may be a bitmap cache unit that comprises a data structure (cf. 1560, 1590 in FIG. 15) for maintaining an indication (cf. 1595 in FIG. 15) of the categorization of each memory region. The categorization handling arrangement 1710 is configured to determine the categorization of the certain memory region by checking the indication 1595 for the certain memory region in the data structure 1560, 1590.

The device 1900 may further comprise a characterization unit (cf. unit 1730 in FIG. 17) for compressed pages which is configured to monitor memory regions presently not being categorized as low spatio-temporal locality for potential re-categorization as low spatio-temporal locality. The characterization unit 1730 for compressed pages will thus be operative to maintain a data structure (cf. ST 1735 in FIG. 17) that comprises a shadow tag array (cf. 940, 730 in FIG. 9 and FIG. 7, respectively), each entry (cf. 980 in FIG. 9) in the shadow tag array representing a compressed package of a number of consecutive memory blocks of a memory region. The characterization unit 1730 for compressed pages will further be operative to maintain an address translation table (cf. 700 in FIG. 7) that comprises a metadata array (cf. 760 in FIG. 7), each entry (cf. 790 in FIG. 7) in the metadata array representing a memory region and comprising at least one counter (cf. 796 in FIG. 7) of the number of times that memory requests have been directed to memory blocks represented in the shadow tag array 940, 730. The characterization unit 1730 for compressed pages will further be operative, upon eviction from the address translation table 700, to analyze said at least one counter 796 to determine whether the memory region shall be re-categorized as low spatio-temporal locality. In effect, this means re-categorization from non-random-access page to random-access page.

To this end, each entry 790 in the metadata array 760 may advantageously comprise an active counter 798 for a current presence in the address translation table 700 and historic counters for past presences in the address translation table 700. The characterization unit 1730 for compressed pages may thus be configured to determine whether the memory region shall be re-categorized as low spatio-temporal locality by averaging the active and historic counters and comparing to a threshold or to high and low watermarks.

The device 1900 may further comprise a characterization unit (cf. unit 1720 in FIG. 17) for uncompressed pages configured to monitor memory regions presently being categorized as low spatio-temporal locality for potential re-categorization as not being low spatio-temporal locality. The characterization unit 1720 for uncompressed pages will thus be operative to maintain a first data structure (cf. 1040, BP-ST, 1726 in FIG. 10 and FIG. 17) that comprises a shadow tag array, each entry in the shadow tag array representing a number of consecutive memory blocks of a memory region as if they had been compressed and included in a compressed package. The characterization unit 1720 for uncompressed pages will be further operative to maintain a second data structure (cf. 1080, BP-ATT, 1300, 1728 as previously referred to) that mimics an address translation table and that comprises a metadata array (cf. 1360 in FIG. 13), each entry (cf. 1390 in FIG. 13) in the metadata array representing a memory region and comprising at least one counter (cf. 1396 in FIG. 13) of the number of times that memory requests have been directed to memory blocks represented in the shadow tag array.

The characterization unit 1720 for uncompressed pages will be further operative, upon eviction from the second data structure 1080, BP-ATT, 1300, 1728, to analyze said at least one counter 1396 to determine whether the memory region shall be re-categorized as not being low spatio-temporal locality. In effect, this means re-categorization from random-access page to non-random-access page.

Each entry 1390 in the metadata array 1360 may advantageously comprise an active counter 1398 for a current presence in the second data structure 1080, BP-ATT, 1300, 1728 and historic counters for past presences therein. The characterization unit 1720 for uncompressed pages may thus be configured to determine whether the memory region shall be re-categorized as not being low spatio-temporal locality by averaging the active and historic counters and comparing to a threshold or to high and low watermarks.

The method 1800 may generally comprise the same functionality as performed by the structural elements of the device 1900 as described above.

The device 1900, or another device that comprises logic circuitry configured to perform the method in FIG. 18 in any of its embodiments, may be configured to be connected between a memory controller (such as 141 in FIG. 1) and a cache memory (such as 120 in FIG. 1) of a computer system (such as 100 in FIG. 1). Alternatively, such a device may be included in or implemented by a memory controller of a computer system.

The present invention may be embodied in a computer system (such as 100 in FIG. 1) which comprises one or more processors (such as $P_1$-$P_N$ in FIG. 1), compressible main memory (such as $M_1$-$M_K$ in FIG. 1), and a device 1900 for handling memory requests from said one or more processors $P_1$-$P_N$ to the compressible main memory $M_1$-$M_K$.

An alternative aspect of the present invention is a method of managing compressible computer memory, the method comprising: monitoring memory requests to the computer memory to categorize memory regions based on spatio-temporal locality of the memory requests made to the memory regions; and selectively managing the compressible computer memory depending on categorization, such that memory contents of memory regions categorized to exhibit low spatio-temporal locality are stored in uncompressed form in the computer memory, whereas memory contents of memory regions not categorized to exhibit low spatio-temporal locality are stored in compressed form in the computer memory. This method may have any or all of the features of dependent claims 2-12 as attached herewith. A device comprising logic circuitry may be configured to perform the method according to this alternative aspect.

The invention claimed is:

1. A method of managing compressible computer memory, the method comprising:
    monitoring memory requests to the computer memory to categorize memory regions based on spatio-temporal locality of the memory requests made to the memory regions, wherein the memory regions are categorized to exhibit low spatio-temporal locality when memory requests to said memory regions are less frequent than a threshold; and
    selectively managing the compressible computer memory depending on categorization,
        wherein selectively managing the compressible main memory comprises:
            handling memory requests to memory regions categorized to exhibit low spatio-temporal locality by directing the memory requests through a bypassed requests queue to retrieve memory contents in uncompressed form directly from the compressible main memory; and handling memory requests to memory regions not categorized to exhibit low spatio-temporal locality by retrieving memory contents in compressed form from the compressible main memory and decompressing the retrieved memory contents.

2. The method as defined in claim 1, each memory region constituting a memory page in the computer memory, or a sequence of contiguous memory pages in the computer memory, each memory page comprising a number of memory blocks, compressed memory contents being retrievable from the computer memory as a compressed package consisting of a number of compressed consecutive memory blocks compacted into one physical memory block, wherein the memory regions exhibit low spatio-temporal locality when the number of memory requests to memory blocks that belong or would belong to the same compressed package is below the threshold.

3. The method as defined in claim 1, each memory region constituting a memory page in the computer memory, or a sequence of contiguous memory pages in the computer memory, each memory page comprising a number of memory blocks, compressed memory contents being retrievable from the computer memory as a compressed package consisting of a number of compressed consecutive memory blocks compacted into one physical memory block, wherein the memory regions exhibit low spatio-temporal locality when a first memory request to a memory block in the memory region is not followed, within a monitored time period, by a second memory request to a second memory block that belongs or would belong to the same compressed package.

4. The method as defined in claim 3, wherein retrieval of compressed memory contents involves use of an address translation table for mapping physical (uncompressed) locations of memory contents of the memory regions in the computer memory to compressed locations of memory contents of the memory regions in the computer memory, and wherein the monitored time period is a time window from fetching of address translation metadata for the memory region into the address translation table until eviction of said address translation metadata from the address translation table.

5. The method as defined in claim 4, wherein the monitored time period further includes one or more historic time windows from fetching to eviction of the address translation metadata for the memory region.

6. The method as defined in claim 1, further comprising:

receiving a memory request pertaining to a certain memory region;

determining the categorization of the certain memory region;

selectively processing the received memory request depending on the determined categorization as follows:

when the determined categorization of the certain memory region is not low spatio-temporal locality, handling the received memory request as a compressed memory request by invoking a compressed memory access mechanism having functionality for retrieving compressed memory contents from the computer memory; and when the determined categorization of the certain memory region is low spatio-temporal locality, handling the received memory request as an uncompressed memory request by bypassing the compressed memory access mechanism and retrieving requested memory contents in uncompressed form directly from the computer memory.

7. The method as defined in claim 6, wherein handling the memory request as a compressed memory request by invoking the compressed memory access mechanism involves:

checking whether requested memory contents exist in decompressed form in a prefetch buffer;

if so:

responding to the received memory request with decompressed memory contents from the prefetch buffer;

if not:

retrieving metadata, required for the retrieval of the requested memory contents, either from an address-translation table or, if unavailable in the address-translation table, from the computer memory;

retrieving the requested memory contents in compressed form from the computer memory using the retrieved metadata;

decompressing the retrieved memory contents; and responding to the received memory request with the decompressed memory contents.

8. The method as defined in claim 6, further comprising maintaining a data structure comprising an indication of the categorization of each memory region, wherein determining the categorization of the certain memory region involves checking the indication for the certain memory region in the data structure.

9. The method as defined in claim 1, further comprising monitoring of the memory regions presently not being categorized as low spatio-temporal locality for potential re-categorization as low spatio-temporal locality by:

maintaining a data structure that comprises a shadow tag array, each entry in the shadow tag array representing a compressed package of a number of consecutive memory blocks of a memory region of the memory regions, maintaining an address translation table that comprises a metadata array, each entry in the metadata array representing the memory region and comprising at least one counter of the number of times that memory requests have been directed to memory blocks represented in the shadow tag array; and upon eviction from the address translation table, analyzing said at least one counter to determine whether the memory region shall be re-categorized as low spatio-temporal locality.

10. The method as defined in claim 9, wherein each entry in the metadata array comprises an active counter for a current presence in the address translation table and historic counters for past presences in the address translation table, and wherein the determining of whether the memory region shall be re-categorized as low spatio-temporal locality involves averaging the active and historic counters and comparing to a threshold or to high and low watermarks.

11. The method as defined in claim 1, further comprising monitoring of the memory regions presently being categorized as low spatio-temporal locality for potential re-categorization as not being low spatio-temporal locality by:

maintaining a first data structure that comprises a shadow tag array, each entry in the shadow tag array representing a number of consecutive memory blocks of a memory region of the memory regions as if they had been compressed and included in a compressed package, maintaining a second data structure that mimics an address translation table and that comprises a metadata array, each entry in the metadata array representing the memory region and comprising at least one counter of the number of times that memory requests have been directed to memory blocks represented in the shadow tag array; and upon eviction from the second data structure, analyzing said at least one counter to determine whether the memory region shall be re-categorized as not being low spatio-temporal locality.

12. The method as defined in claim 11, wherein each entry in the metadata array comprises the active counter for a current presence in the second data structure and the historic counters for past presences therein, and wherein the determining of whether the memory region shall be re-categorized as not being low spatio-temporal locality involves averaging the active and historic counters and comparing to a threshold or to high and low watermarks.

13. A device comprising logic circuitry configured to perform the method according to claim 1.

14. The device as defined in claim 13, configured to be connected between a memory controller and a cache memory of a computer system.

15. The device as defined in claim 13, included in or implemented by a memory controller of a computer system.

16. A device for managing compressible computer memory, the device comprising:

a bitmap cache unit configured to monitor memory requests to the computer memory and categorize memory regions based on spatio-temporal locality of the memory requests made to the memory regions, wherein the memory regions are categorized to exhibit low spatio-temporal locality when memory requests to said memory regions are less frequent than a threshold; and a bypassed requests queue and a compressed-page read path, a compressed-page write path, and an address translation table, operatively connected with the bitmap cache unit, wherein:

the bypassed requests queue is configured to handle memory contents of memory regions categorized to exhibit low spatio-temporal locality in uncompressed form in the computer memory, and the compressed-page read path, the compressed-page write path, and the address translation table are configured to handle memory contents of memory regions not categorized to exhibit low spatio-temporal locality in compressed form in the computer memory.

17. The device as defined in claim 16, each memory region constituting a memory page in the computer memory, or a sequence of contiguous memory pages in the computer memory, each memory page comprising a number of memory blocks, compressed memory contents being retrievable from the computer memory as a compressed package consisting of a number of compressed consecutive memory blocks compacted into one physical memory block, wherein the memory regions exhibit low spatio-temporal locality when the number of memory requests to memory blocks that belong or would belong to the same compressed package is below the threshold.

18. The device as defined in claim 17, wherein retrieval of compressed memory contents involves use of an address translation table for mapping physical (uncompressed) locations of memory contents of the memory regions in the computer memory to compressed locations of memory contents of the memory regions in the computer memory, and wherein the monitored time period is a time window from fetching of address translation metadata for the memory region into the address translation table until eviction of said address translation metadata from the address translation table.

19. The device as defined in claim 18, wherein the monitored time period further includes one or more historic time windows from fetching to eviction of the address translation metadata for the memory region.

20. The device as defined in claim 16, further comprising a categorization handling arrangement configured to receive a memory request pertaining to a certain memory region, determine the categorization of the certain memory region, and cause selective processing of the received memory request depending on the determined categorization as follows:

when the determined categorization of the certain memory region is not low spatio-temporal locality, handling the received memory request as a compressed memory request by invoking the compressed-page read path, the compressed-page write path, and the address translation table to retrieve requested compressed memory contents from the computer memory, and when the determined categorization of the certain memory region is low spatio-temporal locality, handling the received memory request as an uncompressed memory request by invoking the bypassed requests queue to bypass the compressed-page read path, the compressed-page write path, and the address translation table and retrieve requested memory contents in uncompressed form directly from the computer memory.

21. The device as defined in claim 20, wherein the compressed-page read path further comprises a prefetch buffer and is configured to handle the compressed memory request by:

checking whether requested memory contents exist in decompressed form in the prefetch buffer;

if so:

responding to the received memory request with decompressed memory contents from the prefetch buffer;

if not:

retrieving metadata, required for the retrieval of the requested memory contents, either from an address-translation table or, if unavailable in the address-translation table, from the computer memory;

retrieving the requested memory contents in compressed form from the computer memory using the retrieved metadata;

decompressing the retrieved memory contents; and responding to the received memory request with the decompressed memory contents.

22. The device as defined in claim 20, wherein the categorization handling arrangement comprises a data structure for maintaining an indication of the categorization of each memory region, and wherein the categorization handling arrangement is configured to determine the categorization of the certain memory region by checking the indication for the certain memory region in the data structure.

23. The device as defined in claim 16, further comprising a characterization unit for compressed pages configured to monitor the memory regions presently not being categorized as low spatio-temporal locality for potential re-categorization as low spatio-temporal locality by:

maintaining a data structure that comprises a shadow tag array, each entry in the shadow tag array representing a compressed package of a number of consecutive memory blocks of a memory region of the memory regions, maintaining an address translation table that comprises a metadata array, each entry in the metadata array representing the memory region and comprising at least one counter of the number of times that memory requests have been directed to memory blocks represented in the shadow tag array; and upon eviction from the address translation table, analyzing said at least one counter to determine whether the memory region shall be re-categorized as low spatio-temporal locality.

24. The device as defined in claim 23, wherein each entry in the metadata array comprises an active counter for a current presence in the address translation table and historic counters for past presences in the address translation table, and wherein the characterization unit for compressed pages is configured to determine whether the memory region shall be re-categorized as low spatio-temporal locality by averaging the active and historic counters and comparing to a threshold or to high and low watermarks.

25. The device as defined in claim 16, further comprising a characterization unit for uncompressed pages configured to monitor the memory regions presently being categorized as low spatio-temporal locality for potential re-categorization as not being low spatio-temporal locality by:

maintaining a first data structure that comprises a shadow tag array, each entry in the shadow tag array representing a number of consecutive memory blocks of a memory region of the memory regions as if they had been compressed and included in a compressed package, maintaining a second data structure that mimics an address translation table and that comprises a metadata array, each entry in the metadata array representing the memory region and comprising at least one counter of the number of times that memory requests have been directed to memory blocks represented in the shadow tag array; and upon eviction from the second data structure, analyzing said at least one counter to determine whether the memory region shall be re-categorized as not being low spatio-temporal locality.

26. The device as defined in claim 25, wherein each entry in the metadata array comprises an active counter for a current presence in second data structure and historic counters for past presences therein, and wherein the characterization unit for uncompressed pages is configured to determine whether the memory region shall be re-categorized as not being low spatio-temporal locality by averaging the active and historic counters and comparing to a threshold or to high and low watermarks.

27. A computer system comprising:

one or more processors;

compressible main memory; and a device for handling memory requests from said one or more processors to the compressible main memory, said device comprising logic circuitry configured to perform the following functionality:

monitoring memory requests to the compressible main memory to categorize memory regions based on spatio-temporal locality of the memory requests made to the memory regions, wherein the memory regions are categorized to exhibit low spatio-temporal locality when memory requests to said memory regions are less frequent than a threshold; and selectively managing the compressible main memory depending on categorization;

wherein selectively managing the compressible main memory comprises:

handling memory requests to memory regions categorized to exhibit low spatio-temporal locality by directing the memory requests through a bypassed requests queue to retrieve memory contents in uncompressed form directly from the compressible main memory; and handling memory requests to memory regions not categorized to exhibit low spatio-temporal locality by retrieving memory contents in compressed form from the compressible main memory and decompressing the retrieved memory contents.

28. A computer system comprising:

one or more processors;

compressible main memory; and a device according to claim 16 for handling memory requests from said one or more processors to the compressible main memory.

\* \* \* \* \*